(12) United States Patent
McClellan et al.

(10) Patent No.: US 9,067,565 B2
(45) Date of Patent: Jun. 30, 2015

(54) SYSTEM AND METHOD FOR EVALUATING DRIVER BEHAVIOR

(75) Inventors: Scott McClellan, Heber City, UT (US); Todd Follmer, Coto de Caza, CA (US)

(73) Assignee: inthinc Technology Solutions, Inc., West Valley City, UT (US)

( * ) Notice: Subject to any disclaimer, the term of this patent is extended or adjusted under 35 U.S.C. 154(b) by 289 days.

(21) Appl. No.: 11/755,556

(22) Filed: May 30, 2007

(65) Prior Publication Data

US 2008/0255722 A1 Oct. 16, 2008

Related U.S. Application Data

(63) Continuation-in-part of application No. 11/805,237, filed on May 22, 2007, now Pat. No. 8,630,768.

(60) Provisional application No. 60/802,478, filed on May 22, 2006.

(51) Int. Cl.
*G07C 5/02* (2006.01)
*G07C 5/08* (2006.01)
*B60R 25/30* (2013.01)
*G07C 5/00* (2006.01)
*G08G 1/00* (2006.01)
(Continued)

(52) U.S. Cl.
CPC ............. *B60R 25/302* (2013.01); *B60R 25/102* (2013.01); *G07C 5/008* (2013.01); *G07C 5/0841* (2013.01); *G08G 1/20* (2013.01)

(58) Field of Classification Search
CPC ........ G07C 5/008; G07C 5/08; G07C 5/0841; G07C 5/085; G07C 5/0808; G07C 5/0816
USPC .............. 340/425.5; 701/35, 29, 52; 702/182; 705/1, 4, 400; 707/10, 104.1
See application file for complete search history.

(56) References Cited

U.S. PATENT DOCUMENTS

| | | | |
|---|---|---|---|
| 3,975,708 | A | 8/1976 | Lusk |
| 4,344,136 | A | 8/1982 | Panik |
| 4,369,427 | A | 1/1983 | Drebinger et al. |

(Continued)

FOREIGN PATENT DOCUMENTS

| | | |
|---|---|---|
| CA | 2071931 | 12/1993 |
| CA | 2307259 | 10/2001 |

(Continued)

OTHER PUBLICATIONS

Zhu et al., "A Small Low-Cost Hybrid Orientation system and Its Error Analysis", Sensors Journal, IEEE—vol. 9, Issue 3, Digital Object Identifier: 10.1109/JSEN.2008.2012196; Publication Year: Mar. 2009, pp. 223-230.

(Continued)

*Primary Examiner* — Khoi Tran
*Assistant Examiner* — Dale Moyer
(74) *Attorney, Agent, or Firm* — Workman Nydegger

(57) ABSTRACT

System and method for evaluating driver performance, comprising detecting operations of a vehicle using an on-board vehicle monitoring system, comparing the operations to predetermined criteria, identifying violations of the predetermined criteria, tracking violations that occur during an evaluation period, and, at the end of the evaluation period, calculating a grade associated with operation of the vehicle.

47 Claims, 6 Drawing Sheets

(51) Int. Cl.
*B60R 25/102* (2013.01)
*G06F 19/00* (2011.01)

(56) References Cited

U.S. PATENT DOCUMENTS

| | | | |
|---|---|---|---|
| 4,395,624 A | 7/1983 | Wartski | |
| 4,419,654 A | 12/1983 | Funk | |
| 4,458,535 A | 7/1984 | Juergens | |
| 4,591,823 A | 5/1986 | Horvat | |
| 4,785,280 A | 11/1988 | Fubini | |
| 4,843,578 A * | 6/1989 | Wade | 702/142 |
| 4,926,417 A | 5/1990 | Futami | |
| 4,939,652 A | 7/1990 | Steiner | |
| 5,006,829 A | 4/1991 | Miyamoto et al. | |
| 5,032,821 A | 7/1991 | Domanico | |
| 5,064,151 A | 11/1991 | Cerimele et al. | |
| 5,074,144 A * | 12/1991 | Krofchalk et al. | 73/114.37 |
| 5,119,504 A | 6/1992 | Durboraw, III | |
| 5,223,844 A | 6/1993 | Mansell et al. | |
| 5,225,842 A | 7/1993 | Brown et al. | |
| 5,303,163 A | 4/1994 | Ebaugh et al. | 364/550 |
| 5,305,214 A | 4/1994 | Komatsu | |
| 5,309,139 A | 5/1994 | Austin | |
| 5,311,197 A | 5/1994 | Sorden et al. | |
| 5,325,082 A | 6/1994 | Rodriguez | |
| 5,347,260 A | 9/1994 | Ginzel | |
| 5,353,023 A | 10/1994 | Mitsugi | |
| 5,359,528 A | 10/1994 | Haendel | |
| 5,365,114 A | 11/1994 | Tsurushima | |
| 5,365,451 A | 11/1994 | Wang et al. | |
| 5,381,155 A | 1/1995 | Gerber | |
| 5,394,136 A | 2/1995 | Lammers | |
| 5,400,018 A | 3/1995 | Scholl | |
| 5,414,432 A | 5/1995 | Penny, Jr. et al. | |
| 5,422,624 A | 6/1995 | Smith | |
| 5,424,584 A | 6/1995 | Matsuda | |
| 5,430,432 A | 7/1995 | Camhi | |
| 5,436,612 A | 7/1995 | Aduddell | |
| 5,436,837 A | 7/1995 | Gerstung et al. | |
| 5,446,659 A | 8/1995 | Yamawaki | |
| 5,453,939 A | 9/1995 | Hoffman | |
| 5,457,439 A | 10/1995 | Kuhn | |
| 5,475,597 A | 12/1995 | Buck | |
| 5,485,116 A | 1/1996 | Cserveny et al. | |
| 5,485,161 A | 1/1996 | Vaughn | |
| 5,499,182 A | 3/1996 | Ousborne | |
| 5,521,579 A | 5/1996 | Bernhard | |
| 5,521,580 A | 5/1996 | Kaneko | |
| 5,525,960 A | 6/1996 | McCall | |
| 5,546,305 A * | 8/1996 | Kondo | 701/29 |
| 5,548,273 A | 8/1996 | Nicol | |
| 5,570,087 A | 10/1996 | Lemelson | |
| 5,581,464 A | 12/1996 | Woll | |
| 5,586,130 A | 12/1996 | Doyle | |
| 5,600,558 A | 2/1997 | Mearek | |
| 5,612,875 A | 3/1997 | Haendel | |
| 5,625,337 A | 4/1997 | Medawar | |
| 5,638,077 A | 6/1997 | Martin | |
| 5,642,284 A | 6/1997 | Parupalli | |
| 5,648,755 A | 7/1997 | Yagihashi | |
| 5,659,289 A | 8/1997 | Zonkoski | |
| 5,689,067 A | 11/1997 | Klein | |
| 5,708,417 A | 1/1998 | Tallman | |
| 5,717,374 A | 2/1998 | Smith | |
| 5,719,771 A | 2/1998 | Buck | |
| 5,723,768 A | 3/1998 | Ammon | |
| 5,731,285 A | 3/1998 | Pavone et al. | |
| 5,731,785 A | 3/1998 | Lemelson et al. | |
| 5,740,548 A | 4/1998 | Hudgens | |
| 5,742,915 A | 4/1998 | Stafford | |
| 5,751,245 A | 5/1998 | Janky et al. | |
| 5,764,139 A | 6/1998 | Nojima | |
| 5,767,767 A | 6/1998 | Lima | |
| 5,777,580 A | 7/1998 | Janky et al. | |
| 5,795,997 A | 8/1998 | Gittins | |
| 5,797,134 A | 8/1998 | McMillan et al. | |
| 5,801,618 A | 9/1998 | Jenkins | |
| 5,801,948 A | 9/1998 | Wood | |
| 5,815,071 A | 9/1998 | Doyle | |
| 5,819,090 A | 10/1998 | Wolf et al. | |
| 5,819,198 A | 10/1998 | Peretz | |
| 5,825,283 A | 10/1998 | Camhi | |
| 5,825,284 A | 10/1998 | Dunwoody | |
| 5,829,782 A | 11/1998 | Breed et al. | |
| 5,844,475 A | 12/1998 | Horie | |
| 5,847,271 A | 12/1998 | Poublon | |
| 5,862,500 A | 1/1999 | Goodwin | |
| 5,867,093 A | 2/1999 | Dodd | |
| 5,877,678 A | 3/1999 | Donoho | |
| 5,880,674 A | 3/1999 | Ufkes | |
| 5,880,958 A | 3/1999 | Helms et al. | |
| 5,883,594 A | 3/1999 | Lau | |
| 5,892,434 A | 4/1999 | Carlson | |
| 5,907,277 A | 5/1999 | Tokunaga | |
| 5,914,654 A | 6/1999 | Smith | |
| 5,918,180 A | 6/1999 | Dimino | |
| 5,926,087 A | 7/1999 | Busch | |
| 5,928,291 A | 7/1999 | Jenkins et al. | |
| 5,933,080 A | 8/1999 | Nojima | |
| 5,941,915 A | 8/1999 | Federle et al. | 701/1 |
| 5,945,919 A | 8/1999 | Trask | |
| 5,949,330 A | 9/1999 | Hoffman | |
| 5,949,331 A | 9/1999 | Schofield | |
| 5,952,941 A | 9/1999 | Mardirossian | |
| 5,954,781 A | 9/1999 | Slepian | |
| 5,955,942 A | 9/1999 | Slifkin | |
| 5,957,986 A | 9/1999 | Coverdill | |
| 5,964,816 A | 10/1999 | Kincaid | |
| 5,969,600 A | 10/1999 | Tanguay | |
| 5,974,356 A | 10/1999 | Doyle et al. | |
| 5,978,737 A | 11/1999 | Pawlowski | |
| 5,982,278 A | 11/1999 | Cuvelier | |
| 5,987,976 A | 11/1999 | Sarangapani | |
| 5,999,125 A | 12/1999 | Kurby | |
| 6,002,327 A | 12/1999 | Boesch | |
| 6,008,724 A | 12/1999 | Thompson | |
| 6,018,293 A | 1/2000 | Smith | |
| 6,026,292 A | 2/2000 | Coppinger et al. | |
| 6,028,508 A | 2/2000 | Mason | |
| 6,028,510 A | 2/2000 | Tamam | |
| 6,037,861 A | 3/2000 | Ying | |
| 6,037,862 A | 3/2000 | Ying | |
| 6,038,496 A | 3/2000 | Dobler | |
| 6,044,315 A | 3/2000 | Honeck | |
| 6,059,066 A | 5/2000 | Lary | |
| 6,060,989 A | 5/2000 | Gehlot | |
| 6,064,886 A | 5/2000 | Perez et al. | |
| 6,064,928 A | 5/2000 | Wilson | |
| 6,064,970 A | 5/2000 | McMillan et al. | |
| 6,067,008 A | 5/2000 | Smith | |
| 6,067,009 A | 5/2000 | Hozuka | |
| 6,072,388 A | 6/2000 | Kyrtsos | |
| 6,073,007 A | 6/2000 | Doyle | |
| 6,075,458 A | 6/2000 | Ladner et al. | |
| 6,078,853 A | 6/2000 | Ebner | |
| 6,081,188 A | 6/2000 | Kutlucinar | |
| 6,084,870 A | 7/2000 | Wooten et al. | |
| 6,094,149 A | 7/2000 | Wilson | |
| 6,098,048 A | 8/2000 | Dashefsky | |
| 6,100,792 A | 8/2000 | Ogino | |
| 6,104,282 A | 8/2000 | Fragoso | |
| 6,108,591 A | 8/2000 | Segal et al. | |
| 6,112,145 A | 8/2000 | Zachman | |
| 6,121,922 A | 9/2000 | Mohan | |
| 6,122,591 A | 9/2000 | Pomerantz | |
| 6,124,810 A | 9/2000 | Segal et al. | |
| 6,130,608 A | 10/2000 | McKeown | |
| 6,131,067 A | 10/2000 | Girerd et al. | |
| 6,133,827 A | 10/2000 | Alvey | |
| 6,138,516 A | 10/2000 | Tillman | |
| 6,141,610 A | 10/2000 | Rothert | |
| 6,147,598 A | 11/2000 | Murphy | |
| 6,172,602 B1 | 1/2001 | Hasfjord | |
| 6,178,374 B1 | 1/2001 | Mohlenkamp et al. | 701/117 |

(56) References Cited

U.S. PATENT DOCUMENTS

| | | |
|---|---|---|
| 6,184,784 B1 | 2/2001 | Shibuya |
| 6,185,501 B1 | 2/2001 | Smith |
| 6,195,015 B1 | 2/2001 | Jacobs et al. |
| 6,198,995 B1 | 3/2001 | Settles |
| 6,204,756 B1 | 3/2001 | Senyk |
| 6,204,757 B1 | 3/2001 | Evans |
| 6,208,240 B1 | 3/2001 | Ledesma |
| 6,212,455 B1 | 4/2001 | Weaver |
| 6,216,066 B1 | 4/2001 | Goebel |
| 6,222,458 B1 | 4/2001 | Harris |
| 6,225,898 B1 | 5/2001 | Kamiya |
| 6,227,862 B1 | 5/2001 | Harkness |
| 6,229,438 B1 | 5/2001 | Kutlucinar |
| 6,232,873 B1 | 5/2001 | Dilz |
| 6,246,933 B1 | 6/2001 | Bague |
| 6,246,948 B1 | 6/2001 | Thakker |
| 6,247,360 B1 | 6/2001 | Anderson |
| 6,249,219 B1 | 6/2001 | Perez |
| 6,253,129 B1 | 6/2001 | Jenkins et al. |
| 6,253,151 B1 | 6/2001 | Ohler et al. |
| 6,255,892 B1 | 7/2001 | Gartner et al. |
| 6,255,939 B1 | 7/2001 | Roth et al. |
| 6,262,657 B1 | 7/2001 | Okuda et al. |
| 6,262,658 B1 | 7/2001 | O'Connor |
| 6,265,989 B1 | 7/2001 | Taylor |
| 6,266,588 B1 | 7/2001 | McClellan |
| 6,278,361 B1 | 8/2001 | Magiawala |
| 6,282,491 B1 | 8/2001 | Bochmann et al. |
| 6,285,931 B1 | 9/2001 | Hattori |
| 6,289,332 B2 | 9/2001 | Menig |
| 6,294,988 B1 | 9/2001 | Shomura |
| 6,294,989 B1 | 9/2001 | Schofield |
| 6,295,492 B1 | 9/2001 | Lang |
| 6,297,768 B1 | 10/2001 | Allen, Jr. |
| 6,301,533 B1 | 10/2001 | Markow |
| 6,306,063 B1 | 10/2001 | Horgan et al. ................ 477/108 |
| 6,308,120 B1 | 10/2001 | Good |
| 6,308,134 B1 | 10/2001 | Croyle et al. |
| 6,313,742 B1 | 11/2001 | Larson |
| 6,314,367 B1 | 11/2001 | Ohler et al. |
| 6,320,497 B1 | 11/2001 | Fukumoto |
| 6,331,825 B1 | 12/2001 | Ladner et al. |
| 6,333,686 B1 | 12/2001 | Waltzer |
| 6,337,653 B1 | 1/2002 | Buchler |
| 6,339,739 B1 | 1/2002 | Folke |
| 6,339,745 B1 | 1/2002 | Novik ............................ 701/208 |
| 6,344,805 B1 | 2/2002 | Yasui |
| 6,351,211 B1 | 2/2002 | Bussard |
| 6,351,709 B2 | 2/2002 | King et al. |
| 6,356,188 B1 | 3/2002 | Meyers |
| 6,356,822 B1 | 3/2002 | Diaz |
| 6,356,833 B2 | 3/2002 | Jeon |
| 6,356,836 B1 | 3/2002 | Adolph ......................... 701/208 |
| 6,359,554 B1 | 3/2002 | Skibinski |
| 6,362,730 B2 | 3/2002 | Razavi |
| 6,362,734 B1 | 3/2002 | McQuade |
| 6,366,199 B1 | 4/2002 | Osborn |
| 6,366,207 B1 | 4/2002 | Murphy |
| 6,378,959 B2 | 4/2002 | Lesesky |
| 6,389,340 B1 | 5/2002 | Rayner |
| 6,393,348 B1 | 5/2002 | Ziegler |
| 6,401,029 B1 | 6/2002 | Kubota et al. |
| 6,404,329 B1 | 6/2002 | Hsu |
| 6,405,112 B1 | 6/2002 | Rayner |
| 6,405,128 B1 | 6/2002 | Bechtolsheim et al. ...... 701/208 |
| 6,415,226 B1 | 7/2002 | Kozak ........................... 701/210 |
| 6,417,764 B2 | 7/2002 | Tonkin |
| 6,424,268 B1 | 7/2002 | Isonaga |
| 6,427,687 B1 | 8/2002 | Kirk |
| 6,430,488 B1 | 8/2002 | Goldman |
| 6,433,681 B1 | 8/2002 | Foo |
| 6,438,472 B1 | 8/2002 | Tano et al. |
| 6,441,732 B1 | 8/2002 | Laitsaari |
| 6,449,540 B1 | 9/2002 | Rayner |
| 6,459,365 B2 | 10/2002 | Tamura |
| 6,459,367 B1 | 10/2002 | Green |
| 6,459,369 B1 | 10/2002 | Wang |
| 6,459,961 B1 | 10/2002 | Obradovich |
| 6,459,969 B1 | 10/2002 | Bates |
| 6,462,675 B1 | 10/2002 | Humphrey |
| 6,472,979 B2 | 10/2002 | Schofield |
| 6,476,763 B2 | 11/2002 | Allen, Jr. |
| 6,480,106 B1 | 11/2002 | Crombez |
| 6,484,035 B2 | 11/2002 | Allen, Jr. |
| 6,484,091 B2 | 11/2002 | Shibata |
| 6,493,650 B1 | 12/2002 | Rodgers |
| 6,512,969 B1 | 1/2003 | Wang |
| 6,515,596 B2 | 2/2003 | Awada |
| 6,519,512 B1 | 2/2003 | Haas |
| 6,523,912 B1 | 2/2003 | Bond, III et al. |
| 6,525,672 B2 | 2/2003 | Chainer |
| 6,526,341 B1 | 2/2003 | Bird et al. |
| 6,529,159 B1 | 3/2003 | Fan et al. |
| 6,535,116 B1 | 3/2003 | Zhou |
| 6,542,074 B1 | 4/2003 | Tharman |
| 6,542,794 B2 | 4/2003 | Obradovich |
| 6,549,834 B2 | 4/2003 | McClellan et al. |
| 6,552,682 B1 | 4/2003 | Fan |
| 6,556,905 B1 | 4/2003 | Mittelsteadt |
| 6,559,769 B2 | 5/2003 | Anthony |
| 6,564,126 B1 | 5/2003 | Lin |
| 6,567,000 B2 | 5/2003 | Slifkin |
| 6,571,168 B1 | 5/2003 | Murphy |
| 6,577,946 B2 | 6/2003 | Myr |
| 6,587,759 B2 | 7/2003 | Obradovich |
| 6,594,579 B1 | 7/2003 | Lowrey |
| 6,599,243 B2 | 7/2003 | Woltermann |
| 6,600,985 B2 | 7/2003 | Weaver |
| 6,604,033 B1 | 8/2003 | Banet |
| 6,609,063 B1 | 8/2003 | Bender et al. ................. 701/209 |
| 6,609,064 B1 | 8/2003 | Dean .............................. 701/213 |
| 6,611,740 B2 | 8/2003 | Lowrey |
| 6,611,755 B1 | 8/2003 | Coffee |
| 6,615,137 B2 | 9/2003 | Lutter et al. |
| 6,622,085 B1 | 9/2003 | Amita et al. ................... 701/208 |
| 6,629,029 B1 | 9/2003 | Giles |
| 6,630,884 B1 | 10/2003 | Shanmugham |
| 6,631,322 B1 | 10/2003 | Arthur et al. .................. 701/211 |
| 6,633,811 B1 | 10/2003 | Aumayer |
| 6,636,790 B1 | 10/2003 | Lightner |
| 6,639,512 B1 | 10/2003 | Lee |
| 6,643,578 B2 | 11/2003 | Levine |
| 6,651,001 B2 | 11/2003 | Apsell |
| 6,654,682 B2 | 11/2003 | Kane et al. |
| 6,657,540 B2 | 12/2003 | Knapp |
| 6,662,013 B2 | 12/2003 | Takiguchi et al. |
| 6,662,141 B2 | 12/2003 | Kaub ............................. 702/181 |
| 6,664,922 B1 | 12/2003 | Fan |
| 6,665,613 B2 | 12/2003 | Duvall |
| 6,674,362 B2 | 1/2004 | Yoshioka |
| 6,675,085 B2 | 1/2004 | Straub |
| 6,677,854 B2 | 1/2004 | Dix |
| 6,678,612 B1 | 1/2004 | Khawam |
| 6,696,932 B2 | 2/2004 | Skibinski |
| 6,701,234 B1* | 3/2004 | Vogelsang ....................... 701/35 |
| 6,703,925 B2 | 3/2004 | Steffel |
| 6,710,738 B2 | 3/2004 | Allen, Jr. |
| 6,714,894 B1 | 3/2004 | Tobey et al. ................... 702/188 |
| 6,718,235 B1 | 4/2004 | Borugian |
| 6,718,239 B2 | 4/2004 | Rayner |
| 6,718,258 B1 | 4/2004 | Barton |
| 6,720,889 B2 | 4/2004 | Yamaki et al. |
| 6,727,809 B1 | 4/2004 | Smith |
| 6,728,542 B2 | 4/2004 | Meda |
| 6,728,605 B2 | 4/2004 | Lash |
| 6,732,031 B1 | 5/2004 | Lowrey |
| 6,732,032 B1 | 5/2004 | Lowrey |
| 6,737,962 B2 | 5/2004 | Mayor |
| 6,741,169 B2 | 5/2004 | Magiawala |
| 6,741,170 B2 | 5/2004 | Alrabady |
| 6,745,153 B2 | 6/2004 | White |
| 6,748,322 B1 | 6/2004 | Fernandez |
| 6,750,761 B1 | 6/2004 | Newman |
| 6,750,762 B1 | 6/2004 | Porter |

(56) References Cited

U.S. PATENT DOCUMENTS

| | | | |
|---|---|---|---|
| 6,756,916 B2 | 6/2004 | Yanai | |
| 6,759,952 B2 | 7/2004 | Dunbridge | |
| 6,766,244 B2 | 7/2004 | Obata et al. | 701/207 |
| 6,768,448 B2 | 7/2004 | Farmer | |
| 6,775,602 B2 | 8/2004 | Gordon | |
| 6,778,068 B2 | 8/2004 | Wolfe | |
| 6,778,885 B2 | 8/2004 | Agashe et al. | |
| 6,784,793 B2 | 8/2004 | Gagnon | |
| 6,784,832 B2 | 8/2004 | Knockeart et al. | |
| 6,788,196 B2 | 9/2004 | Ueda | |
| 6,788,207 B2 | 9/2004 | Wilkerson | |
| 6,792,339 B2 | 9/2004 | Basson | |
| 6,795,017 B1 | 9/2004 | Puranik et al. | |
| 6,798,354 B2 | 9/2004 | Schuessler | |
| 6,803,854 B1 | 10/2004 | Adams et al. | |
| 6,807,481 B1 | 10/2004 | Gastelum | |
| 6,813,549 B2 | 11/2004 | Good | |
| 6,819,236 B2 | 11/2004 | Kawai | |
| 6,822,557 B1 | 11/2004 | Weber | |
| 6,832,141 B2 | 12/2004 | Skeen et al. | |
| 6,845,314 B2 | 1/2005 | Fosseen | |
| 6,845,316 B2 | 1/2005 | Yates | 701/117 |
| 6,845,317 B2 | 1/2005 | Craine | |
| 6,847,871 B2 | 1/2005 | Malik et al. | 701/33 |
| 6,847,872 B2 | 1/2005 | Bodin | |
| 6,847,873 B1 | 1/2005 | Li | |
| 6,847,887 B1 | 1/2005 | Casino | 701/208 |
| 6,850,841 B1 | 2/2005 | Casino | 701/208 |
| 6,859,039 B2 | 2/2005 | Horie | |
| 6,859,695 B2 | 2/2005 | Klausner | |
| 6,865,457 B1 | 3/2005 | Mittelsteadt | |
| 6,867,733 B2 | 3/2005 | Sandhu et al. | |
| 6,868,386 B1 | 3/2005 | Henderson et al. | |
| 6,870,469 B2 | 3/2005 | Ueda | |
| 6,873,253 B2 | 3/2005 | Veziris | |
| 6,873,261 B2 | 3/2005 | Anthony | |
| 6,873,998 B1 | 3/2005 | Dorum et al. | |
| 6,877,007 B1 | 4/2005 | Hentzel et al. | |
| 6,879,894 B1 | 4/2005 | Lightner | |
| 6,885,293 B2 | 4/2005 | Okumura | |
| 6,888,495 B2 | 5/2005 | Flick | |
| 6,892,131 B2 | 5/2005 | Coffee | |
| 6,894,606 B2 | 5/2005 | Forbes et al. | 340/435 |
| 6,895,332 B2 | 5/2005 | King | |
| 6,909,398 B2 | 6/2005 | Knockeart et al. | |
| 6,909,947 B2 * | 6/2005 | Douros et al. | 701/29 |
| 6,914,523 B2 | 7/2005 | Munch | |
| 6,922,133 B2 | 7/2005 | Wolfe | |
| 6,922,616 B2 | 7/2005 | Obradovich | |
| 6,922,622 B2 | 7/2005 | Dulin | |
| 6,925,425 B2 | 8/2005 | Remboski | |
| 6,928,348 B1 | 8/2005 | Lightner | |
| 6,931,309 B2 | 8/2005 | Phelan et al. | |
| 6,937,162 B2 | 8/2005 | Tokitsu | |
| 6,950,013 B2 | 9/2005 | Scaman | |
| 6,954,140 B2 | 10/2005 | Holler | |
| 6,957,133 B1 | 10/2005 | Hunt et al. | |
| 6,958,976 B2 | 10/2005 | Kikkawa | |
| 6,960,168 B2 | 11/2005 | Yanagidaira et al. | |
| 6,965,827 B1 | 11/2005 | Wolfson | 701/207 |
| 6,968,311 B2 | 11/2005 | Knockeart et al. | |
| 6,970,075 B2 | 11/2005 | Cherouny | |
| 6,970,783 B2 | 11/2005 | Knockeart et al. | |
| 6,972,669 B2 | 12/2005 | Saito | |
| 6,980,131 B1 | 12/2005 | Taylor | |
| 6,981,565 B2 | 1/2006 | Gleacher | |
| 6,982,636 B1 | 1/2006 | Bennie | |
| 6,983,200 B2 | 1/2006 | Bodin | |
| 6,988,033 B1 | 1/2006 | Lowrey | |
| 6,988,034 B1 | 1/2006 | Marlatt et al. | 701/200 |
| 6,989,739 B2 | 1/2006 | Li | |
| 7,002,454 B1 | 2/2006 | Gustafson | |
| 7,002,579 B2 | 2/2006 | Olson | |
| 7,005,975 B2 | 2/2006 | Lehner | |
| 7,006,820 B1 | 2/2006 | Parker et al. | |
| 7,019,641 B1 | 3/2006 | Lakshmanan | |
| 7,023,321 B2 | 4/2006 | Brillon et al. | |
| 7,023,332 B2 | 4/2006 | Saito | |
| 7,024,318 B2 | 4/2006 | Fischer | |
| 7,027,808 B2 | 4/2006 | Wesby | |
| 7,034,705 B2 | 4/2006 | Yoshioka | |
| 7,038,578 B2 | 5/2006 | Will | |
| 7,042,347 B2 | 5/2006 | Cherouny | |
| 7,047,114 B1 | 5/2006 | Rogers | |
| 7,049,941 B2 | 5/2006 | Rivera-Cintron | |
| 7,054,742 B2 | 5/2006 | Khavakh et al. | 701/209 |
| 7,059,689 B2 | 6/2006 | Lesesky | |
| 7,069,126 B2 | 6/2006 | Bernard | |
| 7,069,134 B2 | 6/2006 | Williams | |
| 7,072,753 B2 | 7/2006 | Eberle | |
| 7,081,811 B2 | 7/2006 | Johnston | |
| 7,084,755 B1 | 8/2006 | Nord | |
| 7,088,225 B2 | 8/2006 | Yoshioka | |
| 7,089,116 B2 | 8/2006 | Smith | |
| 7,091,880 B2 | 8/2006 | Sorensen | |
| 7,098,812 B2 | 8/2006 | Hirota | |
| 7,099,750 B2 | 8/2006 | Miyazawa | |
| 7,099,774 B2 | 8/2006 | King | |
| 7,102,496 B1 | 9/2006 | Ernst, Jr. | |
| 7,109,850 B2 | 9/2006 | Kawazoe et al. | |
| 7,109,853 B1 | 9/2006 | Mattson | |
| 7,113,081 B1 | 9/2006 | Reichow | |
| 7,113,107 B2 | 9/2006 | Taylor | |
| 7,113,127 B1 | 9/2006 | Banet et al. | |
| 7,117,075 B1 | 10/2006 | Larschan et al. | |
| 7,119,696 B2 | 10/2006 | Borugian | |
| 7,124,027 B1 | 10/2006 | Ernst, Jr. | |
| 7,124,088 B2 | 10/2006 | Bauer et al. | |
| 7,129,825 B2 | 10/2006 | Weber | |
| 7,132,934 B2 | 11/2006 | Allison | |
| 7,132,937 B2 | 11/2006 | Lu | |
| 7,132,938 B2 | 11/2006 | Suzuki | |
| 7,133,755 B2 | 11/2006 | Salman | |
| 7,135,983 B2 | 11/2006 | Filippov | |
| 7,138,916 B2 | 11/2006 | Schwartz | |
| 7,139,661 B2 | 11/2006 | Holze | |
| 7,142,196 B1 | 11/2006 | Connor et al. | |
| 7,145,442 B1 | 12/2006 | Wai | |
| 7,149,206 B2 | 12/2006 | Pruzan | |
| 7,155,259 B2 | 12/2006 | Bauchot et al. | |
| 7,155,321 B2 | 12/2006 | Bromley et al. | 701/29 |
| 7,161,473 B2 | 1/2007 | Hoshal | |
| 7,164,986 B2 | 1/2007 | Humphries | |
| 7,170,390 B2 | 1/2007 | Quiñones | |
| 7,170,400 B2 | 1/2007 | Cowelchuk | |
| 7,174,243 B1 | 2/2007 | Lightner | |
| 7,180,407 B1 | 2/2007 | Guo | |
| 7,180,409 B2 | 2/2007 | Brey | |
| 7,183,942 B2 | 2/2007 | Rock et al. | |
| 7,187,271 B2 | 3/2007 | Nagata | |
| 7,188,025 B2 | 3/2007 | Hudson, Jr. | |
| 7,196,629 B2 | 3/2007 | Ruoss | |
| 7,197,500 B1 | 3/2007 | Israni et al. | 707/100 |
| 7,216,022 B2 | 5/2007 | Kynast et al. | 701/1 |
| 7,216,035 B2 | 5/2007 | Hörtner | |
| 7,218,211 B2 | 5/2007 | Ho | |
| 7,222,009 B2 | 5/2007 | Hijikata | |
| 7,225,060 B2 | 5/2007 | O'Connor et al. | |
| 7,225,065 B1 | 5/2007 | Hunt | |
| 7,228,211 B1 | 6/2007 | Lowrey | |
| 7,233,235 B2 | 6/2007 | Pavlish | |
| 7,236,862 B2 | 6/2007 | Kanno | |
| 7,239,948 B2 | 7/2007 | Nimmo | |
| 7,256,686 B2 | 8/2007 | Koutsky | |
| 7,256,700 B1 | 8/2007 | Ruocco | |
| 7,256,702 B2 | 8/2007 | Isaacs | |
| 7,260,497 B2 | 8/2007 | Watabe | |
| RE39,845 E | 9/2007 | Hasfjord | |
| 7,269,507 B2 | 9/2007 | Cayford | 701/208 |
| 7,269,530 B1 | 9/2007 | Lin | |
| 7,271,716 B2 | 9/2007 | Nou | |
| 7,273,172 B2 | 9/2007 | Olsen, III | |
| 7,280,046 B2 | 10/2007 | Berg | |
| 7,283,904 B2 | 10/2007 | Benjamin | |

(56) References Cited

U.S. PATENT DOCUMENTS

| | | |
|---|---|---|
| 7,286,917 B2 | 10/2007 | Hawkins |
| 7,286,929 B2 | 10/2007 | Staton |
| 7,289,024 B2 | 10/2007 | Sumcad |
| 7,289,035 B2 | 10/2007 | Nathan |
| 7,292,152 B2 | 11/2007 | Torkkola |
| 7,292,159 B2 | 11/2007 | Culpepper |
| 7,298,248 B2 | 11/2007 | Finley |
| 7,298,249 B2 | 11/2007 | Avery, Jr. |
| 7,301,445 B2 | 11/2007 | Moughler |
| 7,317,383 B2 | 1/2008 | Ihara |
| 7,317,392 B2 | 1/2008 | DuRocher |
| 7,317,927 B2 | 1/2008 | Staton |
| 7,319,848 B2 | 1/2008 | Obradovich |
| 7,321,294 B2 | 1/2008 | Mizumaki |
| 7,321,825 B2 | 1/2008 | Ranalli |
| 7,323,972 B2 | 1/2008 | Nobusawa |
| 7,323,974 B2 | 1/2008 | Schmid |
| 7,323,982 B2 | 1/2008 | Staton |
| 7,327,239 B2 | 2/2008 | Gallant |
| 7,327,258 B2 | 2/2008 | Fast |
| 7,333,883 B2 | 2/2008 | Geborek |
| 7,339,460 B2 | 3/2008 | Lane |
| 7,349,782 B2 | 3/2008 | Churchill |
| 7,352,081 B2 | 4/2008 | Taurasi |
| 7,355,508 B2 | 4/2008 | Mian |
| 7,365,639 B2 | 4/2008 | Yuhara |
| 7,366,551 B1 | 4/2008 | Hartley |
| 7,375,624 B2 | 5/2008 | Hines |
| 7,376,499 B2 | 5/2008 | Salman |
| 7,378,946 B2 | 5/2008 | Lahr |
| 7,378,949 B2 | 5/2008 | Chen |
| 7,386,394 B2 | 6/2008 | Shulman |
| 7,397,363 B2 | 7/2008 | Joao |
| 7,421,334 B2 | 9/2008 | Dahlgren et al. ............ 701/117 |
| 7,433,889 B1 | 10/2008 | Barton ...................... 707/104.1 |
| 7,447,509 B2 | 11/2008 | Cossins et al. ................ 455/457 |
| 7,474,264 B2 | 1/2009 | Bolduc et al. |
| 7,474,269 B2 | 1/2009 | Mayer et al. |
| 7,495,547 B2 | 2/2009 | Lich et al. |
| 7,499,949 B2 | 3/2009 | Barton ...................... 707/104.1 |
| 7,565,230 B2 | 7/2009 | Gardner et al. ................. 701/35 |
| 7,584,033 B2 | 9/2009 | Mittelsteadt et al. |
| 7,646,312 B2 | 1/2010 | Rosen |
| 7,660,658 B2 | 2/2010 | Sheynblat |
| 7,671,727 B2 | 3/2010 | Flick |
| 7,671,752 B2 | 3/2010 | Sofer |
| 7,697,917 B2 | 4/2010 | Camp et al. |
| 7,739,036 B2 | 6/2010 | Grimm et al. |
| 7,747,410 B2 | 6/2010 | Van Esch |
| 7,859,392 B2 | 12/2010 | McClellan et al. |
| 7,880,642 B2 | 2/2011 | Gueziec ........................ 340/905 |
| 7,898,388 B2 | 3/2011 | Ehrman et al. ................. 340/5.8 |
| 7,941,258 B1 | 5/2011 | Mittelsteadt et al. ........... 701/35 |
| 8,044,809 B2 | 10/2011 | Farmer |
| 8,090,598 B2 | 1/2012 | Bauer et al. |
| 8,131,205 B2 | 3/2012 | Rosen |
| 8,188,887 B2 | 5/2012 | Catten et al. |
| 8,233,880 B2 | 7/2012 | Johnson |
| 8,314,708 B2 | 11/2012 | Gunderson et al. |
| 8,384,555 B2 | 2/2013 | Rosen |
| 8,428,307 B2 | 4/2013 | Bradai et al. |
| 8,461,973 B2 | 6/2013 | Reed et al. |
| 8,630,768 B2 | 1/2014 | McClellan et al. |
| 2001/0014849 A1 | 8/2001 | King et al. |
| 2001/0018628 A1 | 8/2001 | Jenkins et al. ................... 701/35 |
| 2002/0019703 A1 | 2/2002 | Levine |
| 2002/0024444 A1 | 2/2002 | Hiyama et al. ................. 340/576 |
| 2002/0026334 A1 | 2/2002 | Igoe |
| 2002/0029226 A1 | 3/2002 | Li et al. |
| 2002/0111725 A1* | 8/2002 | Burge ............................. 701/29 |
| 2002/0116228 A1 | 8/2002 | Bauer et al. |
| 2002/0120371 A1 | 8/2002 | Leivian et al. |
| 2002/0126023 A1 | 9/2002 | Awada |
| 2002/0128000 A1 | 9/2002 | do Nascimento, Jr. |
| 2002/0173881 A1 | 11/2002 | Lash et al. |
| 2003/0013460 A1 | 1/2003 | Papadias et al. |
| 2003/0016636 A1 | 1/2003 | Tari et al. |
| 2003/0045273 A1 | 3/2003 | Pyhalammi et al. |
| 2003/0052797 A1 | 3/2003 | Rock et al. |
| 2003/0055555 A1 | 3/2003 | Knockeart et al. |
| 2003/0060950 A1 | 3/2003 | McKeown et al. |
| 2003/0069000 A1 | 4/2003 | Kindo et al. |
| 2003/0125854 A1 | 7/2003 | Kawasaki et al. |
| 2003/0134660 A1 | 7/2003 | Himmel et al. |
| 2003/0169185 A1 | 9/2003 | Taylor |
| 2003/0191564 A1 | 10/2003 | Haugse et al. |
| 2004/0039504 A1 | 2/2004 | Coffee et al. |
| 2004/0039609 A1 | 2/2004 | Burkitt |
| 2004/0054687 A1 | 3/2004 | McDonough |
| 2004/0056779 A1 | 3/2004 | Rast |
| 2004/0066330 A1 | 4/2004 | Knockeart et al. |
| 2004/0077339 A1 | 4/2004 | Martens |
| 2004/0083041 A1 | 4/2004 | Skeen et al. |
| 2004/0107037 A1 | 6/2004 | Straub |
| 2004/0107220 A1 | 6/2004 | Natesan et al. |
| 2004/0139034 A1 | 7/2004 | Farmer |
| 2004/0142672 A1 | 7/2004 | Stankewitz |
| 2004/0153362 A1 | 8/2004 | Bauer et al. |
| 2004/0172418 A1 | 9/2004 | Dorum et al. |
| 2004/0176083 A1 | 9/2004 | Shiao et al. |
| 2004/0186661 A1 | 9/2004 | Barton |
| 2004/0210353 A1 | 10/2004 | Rice ................................. 701/1 |
| 2004/0225557 A1 | 11/2004 | Phelan et al. |
| 2004/0236474 A1 | 11/2004 | Chowdhary et al. ............. 701/1 |
| 2004/0236475 A1* | 11/2004 | Chowdhary ..................... 701/1 |
| 2004/0252027 A1* | 12/2004 | Torkkola et al. .............. 340/576 |
| 2004/0254698 A1 | 12/2004 | Hubbard et al. |
| 2004/0257245 A1 | 12/2004 | Jo |
| 2004/0260579 A1 | 12/2004 | Tremiti |
| 2005/0021270 A1 | 1/2005 | Hong et al. |
| 2005/0049765 A1 | 3/2005 | Chetia et al. |
| 2005/0064835 A1 | 3/2005 | Gusler |
| 2005/0065711 A1 | 3/2005 | Dahlgren et al. |
| 2005/0070245 A1 | 3/2005 | Nath et al. |
| 2005/0091018 A1 | 4/2005 | Craft |
| 2005/0091175 A9 | 4/2005 | Farmer |
| 2005/0096809 A1 | 5/2005 | Skeen et al. |
| 2005/0102098 A1 | 5/2005 | Montealegre et al. |
| 2005/0107944 A1 | 5/2005 | Hovestadt et al. |
| 2005/0119002 A1 | 6/2005 | Bauchot et al. |
| 2005/0131597 A1 | 6/2005 | Raz et al. |
| 2005/0137757 A1 | 6/2005 | Phelan et al. |
| 2005/0143903 A1 | 6/2005 | Park et al. |
| 2005/0171663 A1 | 8/2005 | Mittelsteadt et al. |
| 2005/0184860 A1 | 8/2005 | Taruki et al. |
| 2005/0255874 A1 | 11/2005 | Stewart-Baxter et al. |
| 2005/0273218 A1 | 12/2005 | Breed et al. |
| 2006/0025894 A1 | 2/2006 | Oconnor et al. |
| 2006/0053038 A1 | 3/2006 | Warren et al. |
| 2006/0055565 A1 | 3/2006 | Kawamata et al. |
| 2006/0112573 A1 | 6/2006 | Hillman et al. |
| 2006/0121951 A1 | 6/2006 | Perdomo et al. |
| 2006/0154687 A1 | 7/2006 | McDowell |
| 2006/0193749 A1 | 8/2006 | Ghazarian et al. |
| 2006/0208169 A1 | 9/2006 | Breed et al. |
| 2006/0212195 A1 | 9/2006 | Veith et al. |
| 2006/0212495 A1 | 9/2006 | Tokunaga et al. |
| 2006/0220905 A1 | 10/2006 | Hovestadt |
| 2006/0234711 A1 | 10/2006 | McArdle |
| 2006/0253307 A1 | 11/2006 | Warren et al. |
| 2006/0265125 A1 | 11/2006 | Glaza |
| 2006/0281495 A1 | 12/2006 | Yang |
| 2006/0284769 A1 | 12/2006 | Bolduc et al. |
| 2007/0005404 A1 | 1/2007 | Raz et al. |
| 2007/0005609 A1 | 1/2007 | Breed |
| 2007/0027583 A1 | 2/2007 | Tamir et al. |
| 2007/0027726 A1 | 2/2007 | Warren et al. |
| 2007/0050130 A1 | 3/2007 | Grimm et al. |
| 2007/0057781 A1 | 3/2007 | Breed |
| 2007/0061155 A1 | 3/2007 | Ji et al. |
| 2007/0126601 A1 | 6/2007 | Park |
| 2007/0186923 A1 | 8/2007 | Poutiatine et al. |
| 2007/0202929 A1 | 8/2007 | Satake |
| 2007/0229234 A1 | 10/2007 | Smith |

(56) References Cited

U.S. PATENT DOCUMENTS

| | | | |
|---|---|---|---|
| 2007/0236342 A1 | 10/2007 | Hines et al. | |
| 2007/0260363 A1 | 11/2007 | Miller | |
| 2007/0293206 A1 | 12/2007 | Lund | |
| 2008/0027642 A1 | 1/2008 | Winberry et al. | |
| 2008/0030316 A1 | 2/2008 | Flick | |
| 2008/0046274 A1 | 2/2008 | Geelen et al. | |
| 2008/0059055 A1 | 3/2008 | Geelen et al. | |
| 2008/0064413 A1 | 3/2008 | Breed | |
| 2008/0064446 A1 | 3/2008 | Camp et al. | |
| 2008/0065325 A1 | 3/2008 | Geelen et al. | |
| 2008/0082225 A1 | 4/2008 | Barrett | |
| 2008/0120175 A1 | 5/2008 | Doering | |
| 2008/0177469 A1 | 7/2008 | Geelen et al. | |
| 2008/0221787 A1 | 9/2008 | Vavrus | |
| 2008/0243558 A1 | 10/2008 | Gupte | |
| 2008/0252487 A1 | 10/2008 | McClellan et al. | |
| 2008/0255888 A1 | 10/2008 | Berkobin | |
| 2008/0258890 A1 | 10/2008 | Follmer et al. | |
| 2008/0296968 A1 | 12/2008 | Culbert | |
| 2008/0319602 A1 | 12/2008 | McClellan et al. | |
| 2009/0024273 A1 | 1/2009 | Follmer et al. | |
| 2009/0024419 A1 | 1/2009 | McClellan et al. | |
| 2009/0079555 A1 | 3/2009 | Aguirre De Carcer et al. | |
| 2009/0085728 A1 | 4/2009 | Catten et al. | |
| 2010/0030459 A1 | 2/2010 | Geelen et al. | |
| 2010/0030586 A1 | 2/2010 | Taylor et al. | |
| 2010/0035632 A1 | 2/2010 | Catten | |
| 2010/0130182 A1 | 5/2010 | Rosen | |
| 2010/0131189 A1 | 5/2010 | Geelen et al. | |
| 2010/0131304 A1 | 5/2010 | Collopy et al. | |
| 2010/0134182 A1 | 6/2010 | Kapoor et al. | |
| 2010/0205012 A1 | 8/2010 | Mcclellan | |
| 2010/0207751 A1 | 8/2010 | Follmer et al. | |
| 2010/0207787 A1 | 8/2010 | Catten et al. | |
| 2010/0265074 A1 | 10/2010 | Namba et al. | |
| 2011/0115618 A1 | 5/2011 | Catten | |
| 2011/0179080 A1 | 7/2011 | Miyazaki et al. | |
| 2011/0267205 A1 | 11/2011 | McClellan et al. | |
| 2012/0040650 A1 | 2/2012 | Rosen | |
| 2012/0092148 A1 | 4/2012 | Santos | |
| 2012/0181765 A1 | 7/2012 | Hill et al. | |
| 2012/0295646 A1 | 11/2012 | Johnson | |
| 2013/0150004 A1 | 6/2013 | Rosen | |

FOREIGN PATENT DOCUMENTS

| | | | |
|---|---|---|---|
| CA | 2631103 | 11/2008 | |
| DE | 197 00 353 A1 | 7/1998 | ............ B60K 28/00 |
| EP | 0843177 | 5/1998 | |
| EP | 0921509 | 6/1999 | |
| EP | 1811481 | 7/2007 | |
| GB | 2434346 | 7/2007 | |
| GB | 2454224 | 5/2009 | |
| JP | 2004326492 | 11/2004 | |
| JP | 2005-250825 | 9/2005 | |
| JP | 2007235530 | 9/2007 | |
| WO | WO 2004019646 | 3/2004 | |
| WO | WO 2005003885 A2 * | 1/2005 | |
| WO | WO 2005109273 | 11/2005 | |
| WO | WO2005109369 | 11/2005 | |
| WO | WO 2008045320 | 8/2008 | |
| WO | WO2008109477 | 9/2008 | |
| WO | WO 2013033756 | 3/2013 | |
| WO | WO 2013050548 | 4/2013 | |

OTHER PUBLICATIONS

Almazan et al., "Full auto-calibration of a smartphone on board a vehicle using IMU and GPS embedded sensors", Intelligent Vehicles Symposium (IV), 2013 IEEE; Digital Object Identifier: 10.1109/IVS.2013.6629658; Publication Year: Jun. 2013, pp. 1374-1380.

Lupton et al., "Efficient Integration of Inertial Observations Into Visual SLAM Without Initialization", Intelligent Robots and Systems, 2009, IROS 2009, IEEE/RSJ International Conference on: Digital Object Identifier: 10.1109/IROS.2009.5354267, Publication Year: Oct. 2009, pp. 1547-1552.

Mungula et al., "Attitude and Heading System Based on EKF Total State Configuration", Industrial Electronics (ISIE), 2011 IEEE International Symposium on; Digital Object Identifier: 10.1109/ISIE.2011.5984493; Publication Year: Jun. 2011, pp. 2147-2152.

Huddle et al., "Application of Inertial Navigation Systems to Geodetic Position and Gravity Vector Survey", Decision and Control including the 17th Symposium on Adaptive Processes, 1978 IEEE Conference on; vol. 17, Part 1; Digital Object Identifier: 10.1109/CDC.1978.267967; Publication Year: 1978, pp. 459-465. (The month of Publication is irrelevant since the year of Publication is clearly prior to the filing of the Application).

Zhao Yan et al., "Attitude Measurement of Drivers Head Based on Accelerometer and Magnetoresistive Sensor", Fluid Power and Mechatronics (FPM), 2011 International Conference on; Digital Object Identifier: 10.1109/FPM.2011.6045836; Publication Year: Aug. 2011, pp. 613-617.

U.S. Appl. No. 11/805,237, filed Oct. 28, 2013, Notice of Allowance.

Ogle, et al.; *Accuracy of Global Positioning System for Determining Driver Performance Parameters*; Transportation Research Record 1818; Paper No. 02-1063; pp. 12-24.

Shen, et al.; *A computer Assistant for Vehicle Dispatching with Learning Capabilities*; Annals of Operations Research 61; pp. 189-211, 1995.

Tijerina, et al.; *Final Report Supplement; Heavy Vehicle Driver Workload Assessment; Task 5: Workload Assessment Protocol*; U.S. Department of Transportation; 69 pages, Oct. 1996.

Myra Blanco; *Effects of In-Vehicle Information System (IVIS) Tasks on the Information Processing Demands of a Commercial Vehicle Operations (CVO) Driver*; 230 pages, 1999.

Phuyal B., "An Experiment for a 2-D and 3-D GPS/INS configuration for land vehicle applications", Position Location and Navigation Symposium, 2004, PLANS 2004, Digital Object Identifier: 10.1109/PLANS.2004.1308987; Publication Year: 2004, Page(s): 148-152. (The month of Publication is irrelevant since the year of Publication is clearly prior to the filing of the Application).

Roberts et al., "Position Control of VTOL UAVs using IMU and GPS Measurements", Decision and Control and European Conference (CDC-ECC), 2011 50th IEEE Conference on, Digital Object Identifier, 10.1109/CDC.2011.6160854, Publication Year: Dec. 2011, pp. 8082-8087.

Cho et al., "Obeservability Analysis of the INS/GPS Navigation System on the Measurements in Land Vehicle Applications", Control, Automation and Systems, 2007, ICCAS '07, International Conference on Digital Object Identifier: 10.1109/CCAS.2007.4407018, Publication Year: Oct. 2007, pp. 841-846.

Vukajovic et al., "The Practical Design of In-Vehicle Telematics Device with GPS and MEMS Accelerometers", Telecommunications Forum (TELFOR), 2011 19th: Digital Object Identifier: 10.1109/TELFOR.2011.6143692, Publication Year: Nov. 2011, pp. 908-911.

U.S. Appl. No. 11/805,238, filed Jul. 30, 2009, Office Action.
U.S. Appl. No. 11/779,176, filed Mar. 17, 2010, Office Action.
U.S. Appl. No. 11/805,238, filed Apr. 26, 2010, Notice of Allowance.
U.S. Appl. No. 11/805,237, filed Nov. 8, 2010, Office Action.
U.S. Appl. No. 11/768,056, filed Jan. 18, 2011, Office Action.
U.S. Appl. No. 12/222,260, filed Jan. 19, 2011, Office Action.
U.S. Appl. No. 13/012,660, filed Feb. 16, 2011, Office Action.
U.S. Appl. No. 12/379,083, filed Apr. 8, 2011, Office Action.
U.S. Appl. No. 12/379,153, filed Jul. 29, 2011, Office Action.
U.S. Appl. No. 12/379,154, filed Aug. 1, 2011, Office Action.
U.S. Appl. No. 11/805,237, filed Aug. 8, 2011, Office Action.
U.S. Appl. No. 11/779,176, filed Aug. 18, 2011, Office Action.
U.S. Appl. No. 11/768,056, filed Sep. 16, 2011, Office Action.
U.S. Appl. No. 12/222,260, filed Oct. 14, 2011, Office Action.
U.S. Appl. No. 11/779,178, filed Nov. 2, 2011, Office Action.
U.S. Appl. No. 13/012,660, filed Nov. 14, 2011, Office Action.
U.S. Appl. No. 12/379,083, filed Nov. 23, 2011, Office Action.
U.S. Appl. No. 12/379,153, filed Dec. 16, 2011, Office Action.
U.S. Appl. No. 12/379,154, filed Jan. 2012, Notice of Allowance.

(56) References Cited

OTHER PUBLICATIONS

U.S. Appl. No. 11/805,237, filed Feb. 1, 2012, Office Action.
U.S. Appl. No. 12/379,083, filed Feb. 2, 2012, Office Action.
U.S. Appl. No. 11/768,056, filed Feb. 26, 2012, Office Action.
U.S. Appl. No. 12/222,260, filed Mar. 29, 2012, Office Action.
U.S. Appl. No. 13/012,660, filed Apr. 11, 2012, Office Action.
U.S. Appl. No. 11/779,178, filed May 31, 2012, Office Action.
U.S. Appl. No. 11/805,237, filed Jun. 15, 2012, Office Action.
U.S. Appl. No. 11/768,056, filed Jul. 19, 2012, Office Action.
U.S. Appl. No. 12/379,153, filed Jul. 31, 2012, Notice of Allowance.
U.S. Appl. No. 13/012,660, filed Aug. 1, 2012, Office Action.
U.S. Appl. No. 12/222,260, filed Nov. 7, 2012, Office Action.
U.S. Appl. No. 13/012,660, filed Nov. 26, 2012, Office Action.
U.S. Appl. No. 11/805,237, filed Dec. 3, 2012, Office Action.
U.S. Appl. No. 11/779,176, filed Dec. 3, 2012, Office Action.
U.S. Appl. No. 11/779,178, filed Dec. 20, 2012, Office Action.
U.S. Appl. No. 13/012,660, filed Mar. 18, 2013 Office Action.
U.S. Appl. No. 11/779,178, filed May 9, 2013, Office Action.
U.S. Appl. No. 12/379,083, filed May 23, 2013, Office Action.
U.S. Appl. No. 12/222,260, filed Jun. 5, 2013, Office Action.
U.S. Appl. No. 11/805,237, filed Jun. 6, 2013, Office Action.
U.S. Appl. No. 11/768,056, filed Jun. 21, 2013, Office Action.
U.S. Appl. No. 11/779,176, filed Jul. 1, 2013, Notice of Allowance.
U.S. Appl. No. 13/012,660, filed Jul. 8, 2013, Office Action.
U.S. Appl. No. 12/379,153, filed Aug. 14, 2013, Notice of Allowance.
U.S. Appl. No. 12/975,489, filed Oct. 3, 2013, Office Action.
U.S. Appl. No. 12/379,083, filed Jan. 3, 2014, Office Action.
U.S. Appl. No. 11/778,178, filed Feb. 6, 2014, Office Action.
U.S. Appl. No. 11/768,056, filed Feb. 6, 2014, Office Action.
U.S. Appl. No. 13/012,660, filed Feb. 13, 2014, Office Action.
U.S. Appl. No. 12/379,155, filed Jun. 19, 2014, Office Action.
U.S. Appl. No. 13/012,660, filed Jun. 6, 2014, Notice of Allowance.
U.S. Appl. No. 11/779,178, filed May 27, 2014, Notice of Allowance.
Google Maps, "Google Maps", Available at least as early as Dec. 29, 2014. Whole Document.
U.S. Appl. No. 12/379,153, filed Mar. 17, 2014, Office Action.
U.S. Appl. No. 12/975,489, filed Oct. 1, 2014, Notice of Allowance.
U.S. Appl. No. 12/379,153, filed Oct. 6, 2014, Office Action.
U.S. Appl. No. 12/379,153, filed Jan. 9, 2015, Notice of Allowance.

* cited by examiner

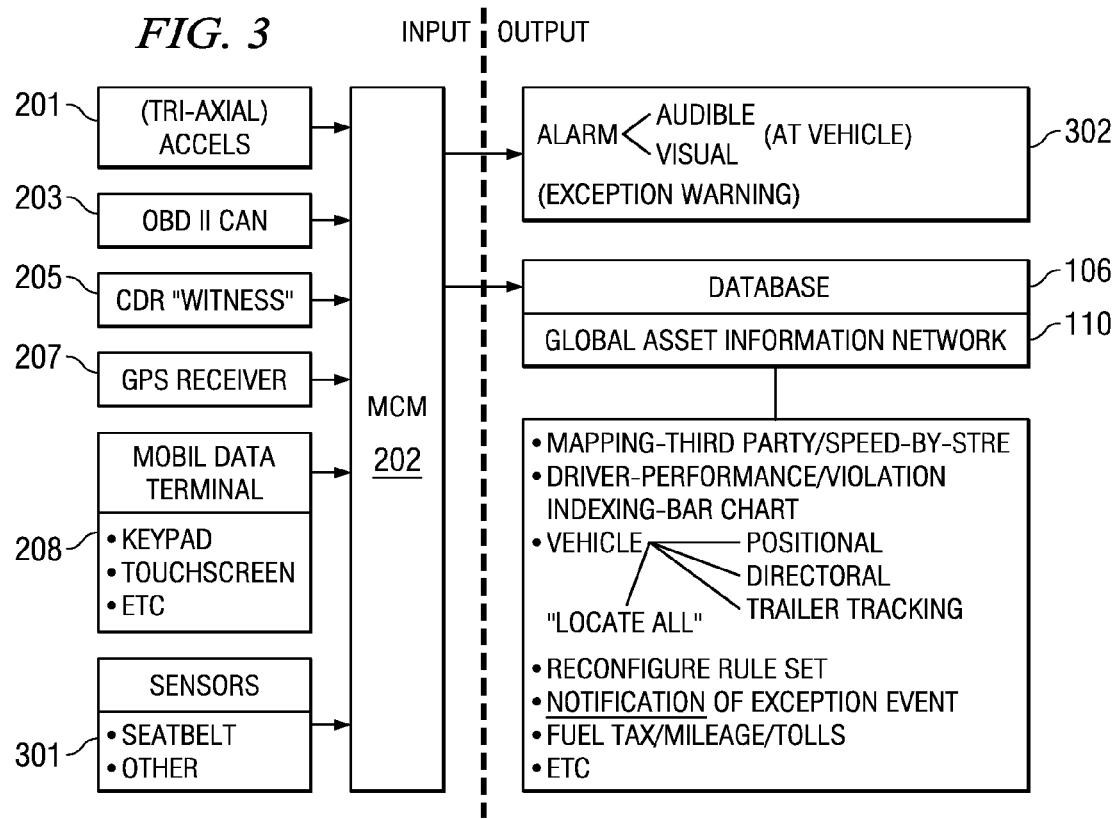
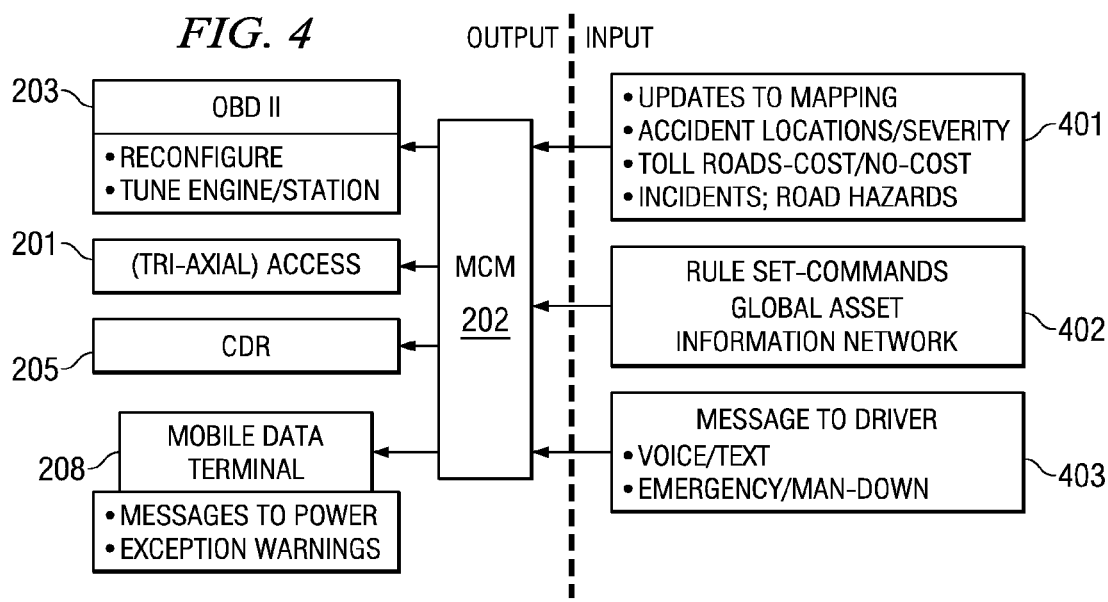

SYSTEM AND METHOD FOR EVALUATING DRIVER BEHAVIOR

This application is a continuation-in-part of U.S. patent application Ser. No. 11/805,237, filed on May 22, 2007 now U.S. Pat. No. 8,630,768, entitled "System and Method for Monitoring Vehicle Parameters and Driver Behavior," which claims the benefit of U.S. Provisional Application No. 60/802,478, filed on May 22, 2006, entitled "Driver Behavior Monitoring System," and which applications are hereby incorporated by reference herein.

TECHNICAL FIELD

The present invention relates generally to a system and method for monitoring driver behavior and vehicle driving conditions and, more particularly, to a system and method for grading a driver's performance.

BACKGROUND

The present invention relates generally to asset management and, more particularly, to a fleet management system incorporating comprehensive driver monitoring/mentoring and asset monitoring capabilities in order to improve driver safety and reduce fuel and maintenance costs across a fleet of vehicles. Advantageously, the fleet management system is fully-configurable at all times including during installation of the system as well as during operation thereof. In addition, the present invention relates to a system and method for monitoring driver behavior for use by consumers or the general public such that parents may remotely mentor the driving habits of their teen children as well as allow for monitoring of geographic areas into which their children may enter. Also, the present invention provides a means for recording impulse forces experienced by a vehicle during a crash event in order to provide real-time notification to fleet management personnel as well as to provide data which may facilitate accident reconstruction and which may be used in the courtroom and by the auto insurance industry.

A recent study released by the Federal Motor Carrier Safety Administration (FMCSA) indicated that driver error was ten times more likely to be the cause of truck-related accidents as compared to other factors such as poor road conditions, weather and mechanical malfunctions. Specifically, the study indicated that certain driver factors such as speeding, inattention, fatigue and unfamiliarity with roads accounted for 88 percent of all crashes involving large trucks. As a means to reduce truck-related accidents, the FMCSA study recommended that greater attention be focused on developing systems for monitoring at-risk driver behavior in commercial motor vehicle fleets in order to improve driver safety.

Losses as a result of accidents involving large truck crashes includes property damage to vehicle and structures as well as personal injury to drivers, occupants and occasionally bystanders. In addition to the financial losses and injuries resulting from truck crashes, fleet operators incur losses as a result of excess fuel and maintenance costs, as well as losses due to inefficient management of individual vehicles in the fleet as well as groups of fleet vehicles such as those located in a specific geographic area. Fleet operators may also suffer losses as a result of vehicle theft, inefficient vehicle routing as a result of unforeseen adverse road conditions along a route, and human losses such as may occur when the driver is injured while performing extravehicular duties.

Included in the prior art are several systems which attempt to address either the problem of driver error as a cause of accidents or by attempting to reduce losses due to inefficient fleet management. For example, U.S. Patent Publication No. 2004/0039504 assigned to Fleet Management Services, Inc., discloses a fleet management information system for identifying the location and direction of movement of each vehicle in the fleet. The Fleet Management Services application discloses that each vehicle in the fleet is in communication directly with management offices in real-time to report vehicle location and heading as well as the status of certain events in which the vehicle may be engaged.

One of the stated objects of the fleet management system disclosed in the application is to improve the availability of fleet management information to owners and operators so as to improve vehicle tracking and enhanced communication within the fleet to increase asset profitability. The application indicates that the above-mentioned objects are facilitated by providing the capability to locate vehicles in the fleet in real-time as well as improving the efficiency of wireless communication within the fleet.

Although the application assigned to Fleet Management Services, Inc., as disclosed above is understood to provide improved fleet business management by minimizing gap times in time division multiple access (TDMA) networks during data transmissions, the application is not understood to address the issue of monitoring driver behavior and/or driver performance in order to improve driver safety and asset health. Furthermore, the application disclosed above is not understood to improve other aspects of fleet operation such as improving fuel economy and reducing maintenance costs of a fleet. In this regard, the application is only understood to improve communication within the fleet and is not understood to improve the amount of information available regarding the operation of each vehicle such that analysis of similar problems may be performed in order to establish trends and ultimately correct problems over time.

U.S. Pat. No. 6,124,810 issued to Segal et al. and assigned to Qualcomm, Inc. discloses a method for determining when a vehicle has arrived and departed from a specific location. More particularly, the Segal patent discloses an apparatus having an on-board mobile communication terminal for receiving destination information wirelessly from a central facility. The apparatus incorporates velocity data from a vehicle speedometer in combination with a communication satellite system in order to provide vehicle position data to a processor.

The processor, located on-board the vehicle, uses speed and position data to determine the vehicle arrival or departure times which is wireless transmitted to the central facility. Although the device of the Segal patent is understood to improve fleet efficiency due to its autonomous transmission of arrival and departure times between a vehicle and a dispatch center, the Segal patent is not understood to address the issue of reducing aggressive driver behavior such as reducing speeding which would improve fleet safety.

U.S. Pat. No. 5,638,077 issued to Martin and assigned to Rockwell International Corporation discloses a fleet management that transmits vehicle positional data to a base station with a time annotation. The positional data further includes velocity data as well as the identity of satellites observed. In this manner, the fleet management system of the Martin reference ostensibly improves fleet management capability by improving the accuracy of GPS positional and directional information. However, the device fails to address the above-noted problems associated with improving driver behavior in fleet operations in order to reduce accident rates and lower fleet operation costs.

BRIEF SUMMARY

As can be seen, there exists a need in the art for a driver mentoring system adaptable for use in commercial fleet operations that monitors at risk and/or unsafe driver behavior and provides mentoring to the driver in order to reduce adverse driver actions and inactions that may lead to accidents. In addition, there exists a need in the art for a driver mentoring system that allows for accurate vehicle tracking at a base station and which can incorporate a third party mapping database in order to provide maximum road speed data for any particular location on a road such that the driver may avoid speeding violations and/or maintain safe, legal, and established speed limits.

Furthermore, there exists a need in the art for a vehicle behavior monitoring system that records velocity and acceleration impulse forces imposed on a vehicle during a crash for use in accident reconstruction for insurance claim and courtroom purposes. Finally, there exists a need in the art for a vehicle behavior monitoring system that provides for real-time reconfiguration of driver performance and vehicle operation parameters from a base station to individual vehicles in a fleet and which allows for reporting of such data in order to generate driver profiles and trends, calculate fuel and mileage tax and create hours of service reports in compliance with federal requirements.

The present invention specifically addresses the above-mentioned needs associated with fleet management by providing a unique vehicle monitoring system specifically adapted to mentor driver performance in order to improve driver safety and reduce accident rates as well as reduce fuel and maintenance costs (as a secondary benefit to good driving behavior—driving the speed limit on paved roads and driving specified and/or configured speed limits on non-paved roads).

In another aspect of the invention, the vehicle monitoring system allows for the recording of crash impulse forces acting on the vehicle during an accident for accident reconstruction purposes and for insurance and injury claim purposes. Fleet utilization is improved by real-time or over-time tracking by GPS of all vehicles in the fleet or tracking per geographic zone, by group, and individually.

The present invention also generates automated International Fuel Tax Agreement (IFTA) reports, mileage reports, hours-of-service (HOS) reports required by the Department of Transportation (DOT) and provides real-time updates on driver behavior and vehicle operation that is accessible anywhere via the internet. Advantageously, the system is fully-configurable in all aspects and at any time including reconfiguring during installation of the system as well as during operation. For example, the invention provides a means by which fleet management can reconfigure the vehicle monitoring system by remote command in order to revise various system parameters such as the type of data to be reported and how often. Conversely, the system can be reconfigured at the vehicle in a comprehensive manner.

Two-way communication between the fleet vehicles and the base station or server allows for notification of fleet management and/or safety personnel during an emergency, during an exception event such as excessive speeding or swerving by a driver, or to allow drivers to report in at specific intervals and times or upon the occurrence of specific events.

BRIEF DESCRIPTION OF THE DRAWINGS

These and other features and advantages of the various embodiments disclosed herein will be better understood with respect to the following description and drawings wherein:

FIG. 3 is an illustration of exemplary inputs that may be provided to the MCM from the vehicle such as by an on-board diagnostic (OBD) system as well as inputs provided by the GPS receiver, the CDR, XL module, MDT and other sensors/devices and which may result in outputs from the MCM such as transmission of data to the DCS and generation of an alarm for the driver;

FIG. 4 is an illustration of exemplary inputs that may be provided to the MCM from the base station/server and which may include commands to reconfigure the rule set/logic of the MCM;

DETAILED DESCRIPTION

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
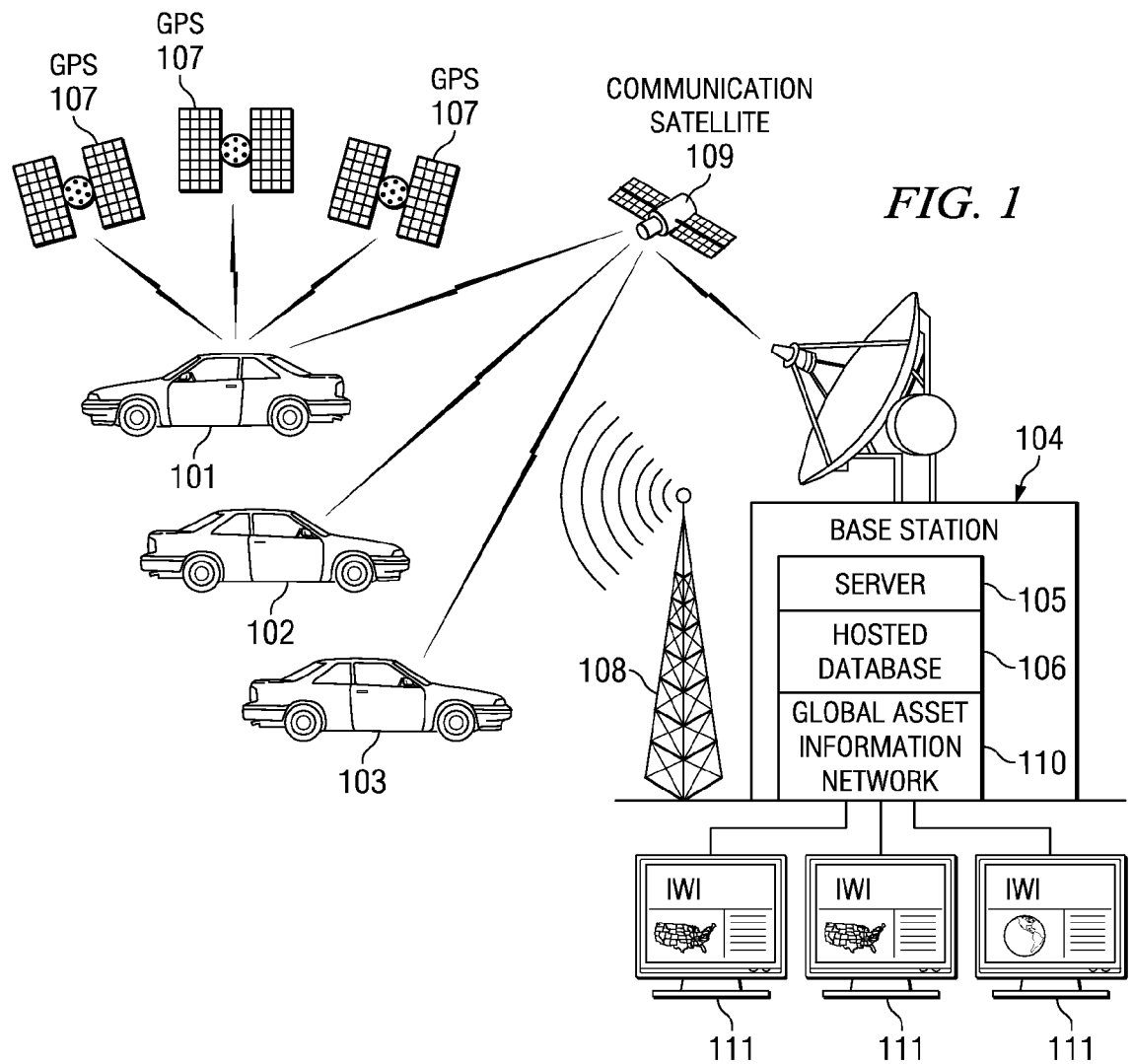
FIG. 1 is an illustration of several GPS-tracked vehicles in wireless communication with a base station having a server containing a fleet management data collection system (DCS) that is also accessible via the internet.

Referring now to the drawings wherein the showings are for purposes of illustrating preferred embodiments of the present invention and not for purposes of limiting the same, shown in FIG. 1 are several vehicles 101-103 of a fleet which are in wireless communication with a base station 104. Each of the vehicles 101-103 in the fleet preferably includes a Global Positioning System (GPS) receiver to allow tracking thereof. The base station 104 includes a server 105 containing a fleet management database 106 or data collection system (DCS) that may be accessible via a securable internet connection or at the server 105 itself.

Figure 2:
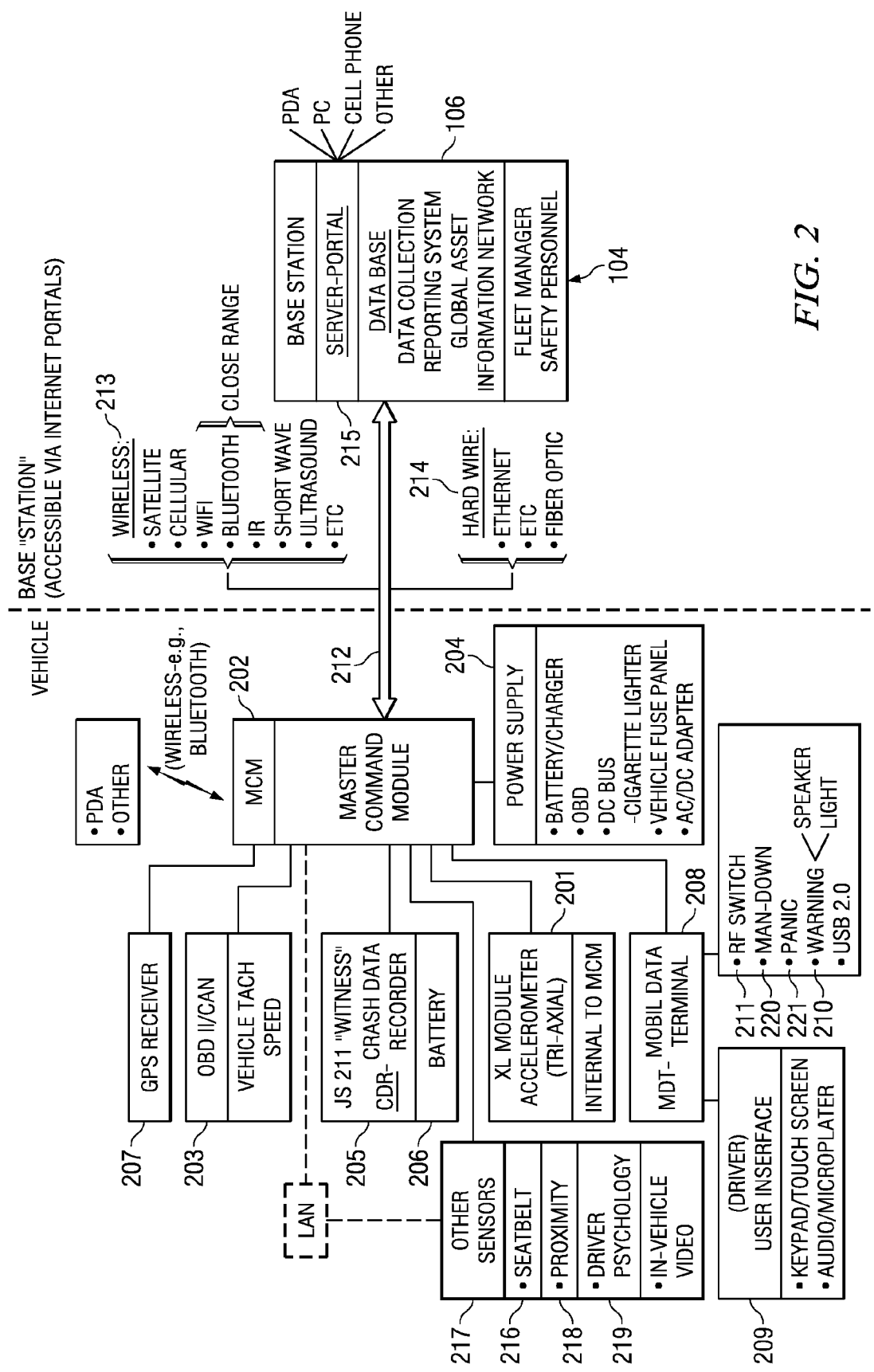
FIG. 2 is a block diagram of a vehicle monitoring system wherein each vehicle may include a GPS receiver (GPS), crash data recorder (CDR), mobile data terminal (MDT), accelerometer module (XL module) and a master command module (MCM) adapted to receive inputs therefrom for transmission to the base station for recording on the DCS and generating reports.

In one aspect of the invention, a vehicle monitoring system is provided for monitoring at least one vehicle 101-103 in the fleet as well as monitoring driver behavior in order to improve safety and reduce fuel and maintenance costs for the fleet. Driver behavior is monitored with the aid of an accelerometer module (XLM) 201 (FIG. 2) which includes at least one accelerometer for measuring at least one of lateral (sideways), longitudinal (forward and aft) and vertical acceleration in order to determine whether the driver is operating the vehicle 101-103 in an unsafe or aggressive manner.

For example, excessive lateral acceleration may be an indication that the driver is operating the vehicle 101-103 at an excessive speed around a turn along a roadway. Furthermore, it is possible that the driver may be traveling at a speed well within the posted speed limit for that area of roadway. However, excessive lateral acceleration, defined herein as "hard turns," may be indicative of aggressive driving by the driver and may contribute to excessive wear on tires and steering components as well as potentially causing the load such as a trailer to shift and potentially overturn.

Furthermore, such hard turns by a particular driver could eventually result in personal injury to the driver/occupants as well as property damage to the vehicle 101-103 and load carried thereby and damage to anything impacted by the vehicle 101-103 should it depart the roadway. Ultimately, such hard turns could result in loss of life if the vehicle is a large truck and the driver loses control resulting in a collision with a smaller vehicle such as a passenger automobile.

As such, it can be seen that monitoring and mentoring such driver behavior by providing warnings to the driver during the occurrence of aggressive driving such as hard turns can improve safety and reduce accidents. In addition, mentoring such aggressive driver behavior can reduce wear and tear on the vehicle and ultimately reduce fleet maintenance costs as well as reduce insurance costs and identify at risk drivers and driving behavior to fleet managers.

In one aspect, the vehicle monitoring system includes a master command module (MCM) 202 which may be in data communication with an on board diagnostic (OBD) II system 203 of the vehicle such as via a port. In some vehicle models, the MCM 202 is placed in data communication with a controller area network (CAN) system (bus) 203 to allow acquisition by the MCM of certain vehicle operating parameters including, but not limited to, vehicle speed such as via the speedometer, engine speed or throttle position such as via the tachometer, mileage such as via the odometer reading, seat belt status, condition of various vehicle systems including anti-lock-braking (ABS), turn signal, headlight, cruise control activation and a multitude of various other diagnostic parameters such as engine temperature, brake wear, etc.

All cars built since Jan. 1, 1996 have OBD-II systems. There are five basic OBD-II protocols in use, each with minor variations on the communication pattern between the on-board diagnostic computer and a maintenance scanner console or tool. By 2008, all vehicles sold in the United States will be required to implement the CAN bus (ISO 15765 CAN), thus eliminating the ambiguity of the existing five signaling protocols. While there are various electrical connection protocols, the command set is fixed according to the SAE J1979 standard. All OBD-II cars have a connector located in the passenger compartment easily accessible from the driver's seat, such as under the dash or behind or near the ashtray. The OBD-II standard specifies a 16-pin J1962 connector and its pinout, the electrical signaling protocols available, and the messaging format. It also includes a list of vehicle parameters to monitor and instructions regarding how to encode the data for each parameter. SAE J1962 defines the pinout of the connector and requires that pins 4 (battery ground) and 16 (battery positive) are present in all configurations.

The OBD or CAN 203 allows for acquisition of the above-mentioned vehicle parameters by the MCM 202 for processing thereby and/or for subsequent transmission to the database 106. In order to enhance reliability and extend its useful life, it is contemplated that the MCM 202 is housed in a sealable housing which may be configured to provide varying degrees of waterproof protection. For operation in extreme temperatures, a heater mechanism may be provided to the housing to enable reliable operation in cold and severe service environments. Ideally, the housing contents (e.g., MCM 202) or the housing itself is configured to withstand excessive vibration and/or shock. The MCM 202 may be mounted in any location in the vehicle such as underneath the seat. The MCM 202 may further include an external power source 204 such as a battery, fuel cell, recharger, AC/DC adapter, DC bus—accessory or cigarette lighter plug, hot lead to vehicle fuse panel, etc., for powering the MCM 202.

The vehicle monitoring system may further include a self-contained and tamper-resistant event data recorder or crash data recorder (CDR) 205 similar to that which is shown and disclosed in U.S. Pat. Nos. 6,266,588 and 6,549,834 issued to McClellan et al., (the disclosures of which are hereby incorporated by reference herein in their entirety) and which is commercially known as "Witness" and commercially available from Independent Witness, Inc. of Salt Lake City, Utah. The CDR 205 is adapted to continuously monitor vehicle motion and begin recording upon supra-threshold impacts whereupon it records the magnitude and direction of accelerations or G-forces experienced by the vehicle as well as recording an acceleration time-history of the impact event and velocity change between pre- and post-impact for a configurable duration following said impact. The recordings are time-date stamped and are providable to the MCM 202 for subsequent transmission to the server DCS 106 if accelerations exceed an impulse threshold.

In addition, the CDR 205 is configured such that data is downloadable such as via a laptop directly from the CDR 205 at the scene of the accident or the CDR itself can be removed from the vehicle for later downloading of data. As will be described in greater detail below, the data (e.g., crash impulses) recorded by the CDR 205 can be correlated to accident severity and injury potential. It is contemplated that CDR data can be combined with recording of driver behavior via the accelerometer module (XLM) 201 in order to determine the probability of crash impact as a cause of personal injury and/or property damage.

Furthermore, the CDR 205 such as that disclosed in the McClellan references is Society of Automotive Engineers (SAE) J211-compliant such that data recorded thereby is admissible in court and can be used to facilitate accident reconstruction as well as for insurance claim purposes. As was earlier mentioned, the CDR 205 is a self-contained component that includes its own power source such as a battery 206 such that the vehicle can operate regardless of the lack of power from the vehicle due to the accident.

Importantly, the XLM 201 may be integrated with the MCM 202 and mounted within the housing. The XLM 201 is operative to monitor driver performance by measuring vehicle acceleration in at least one of lateral, longitudinal and vertical directions over a predetermined time period such as over seconds or minutes. The XLM 201 may include a single uni-axial accelerometer to measure acceleration in any one of the three above-mentioned directions such as in the lateral direction.

Alternatively, the accelerometer may be a bi-axial or a tri-axial accelerometer for measuring acceleration in two or three of the above-mentioned directions or two or three uni-axial accelerometers may be combined to provide measurements. In addition, accelerometers may be oriented in the XLM 201 to measure centripetal, centrifugal, radial, tangential acceleration or acceleration in any other direction. The XLM 201 generates an input signal to the MCM 202 when measured acceleration exceeds a predetermined threshold. Similarly, the XLM 201 may be configured to monitor and record both the day-to-day driving performance as well as capture the crash pulse. Advantageously, the base station and/or MCM 202 is configured to filter out or compensate for gravitational effects on longitudinal, lateral and vertical acceleration measurements when the vehicle is moving on hilly terrain.

As was earlier noted, the vehicle monitoring system includes a GPS receiver 207 in each vehicle in the fleet and which is configured to track in at least one of real-time or over-time modes the location and directional movement of the vehicle. As is well known in the art, signals from at least three GPS satellites 107 (FIG. 1) must be received by a GPS receiver 207 in order to calculate the latitude and longitude of an asset such as a vehicle as well as allowing for tracking of vehicle movement by inferring speed and direction from positional changes. Signals from a fourth GPS satellite 107 allow for calculating the elevation and, hence, vertical movement, of the vehicle. The GPS receiver 207 provides a GPS signal to the MCM 201 which may also be transmitted to the server 105 at the base station 104 for recording into the DCS 106.

The vehicle monitoring system may further include a mobile data terminal (MDT) 208 which may be conveniently mounted for observation and manipulation by the driver such as near the vehicle dash. The MDT 208 preferably has an operator interface 209 such as a keypad, keyboard, touch screen, display screen or any suitable user input device and may further include audio input capability such as a microphone to allow voice communications. Importantly, the MDT 208 may include at least one warning mechanism 210 such as an external speaker and/or a warning light 210 for warning the driver of violation of posted speed limits and/or exceeding acceleration thresholds in lateral, longitudinal and vertical directions as an indication of hard turns, hard braking or hard vertical, respectively. In addition, the MDT 208 may include a manual RF disable switch 211 to prevent RF emissions by the vehicle monitoring system in areas that are sensitive to RF energy.

As was earlier mentioned, the MCM 202 is adapted to receive input signals from the OBD or CAN 203, GPS receiver 207, CDR 205, MDT 208 and XLM 201 and, in this regard, may be hardwired such as to the OBD 203 and XLM 201. Alternatively, because of the small distances between the components installed in the vehicle, short range wireless methods such as infrared, ultrasonic, Bluetooth, and other mediums which may link such components. Regardless of the manner of interconnection (wireless or hardwired), the MCM 202 is operative to transmit to the base station 104 an output signal 212 representative of the measured parameters provided by each component according to a rule set or logic contained within the MCM 202.

Alternatively, the logic may be entirely contained in the database 106 at the server 105 such that all processing is performed at the base station 104 and the appropriate signals transmitted back to the MCM 202. In the latter scheme, the MCM 202 and base station 104 must preferably be in continuous two-way wireless communication which, at the time of this writing, is typically not cost-effective for most fleet operators. Therefore, wireless communication between the MCM 202 and the base station 104 is based on a protocol of information criticality, cost and system availability.

For example, in emergency situations wherein the base station 104 receives a signal from the MCM 202 associated with critical data such as an emergency, signal transmission is by the most expedient and reliable means available with cost being a secondary or tertiary consideration. On the other hand, for non-critical data such as an indication of low tire pressure as provided to the MCM 202 by the OBD 203, notification is transmitted to the base station 104 by the least expensive means and during a latent transmission.

Wireless communication 213 between the MCM 202 and the base station 104 may be provided by a variety of systems including, but not limited to, WiFi, cellular network 108, satellite 109, Bluetooth, infrared, ultrasound, short wave, microwave or any other suitable method. Hardwired communication 214 may be effected at close range such as when the vehicle is within a service yard or at a base station wherein an ethernet connection may suffice.

The DCS 106 is an asset information network that is accessible through at least one server portal 215 and is configured to receive data from the MCM 202 during predetermined time intervals, on demand, during critical events, or randomly. The DCS 106 is also configured to generate reports such as graphic report (e.g., bar charts) of driver performance. The DCS 106 can also be configured to cause the MCM 202 to transmit warning signals to the vehicle during driver violations such as speeding, hard turns, hard brake, hard vertical, seatbelt violation and can also be configured to send a notification to the server 105 during predetermined events such as panic, man down, exception, accident, unauthorized vehicle movement to alert fleet management or safety personnel.

The vehicle monitoring system is configured to monitor driver speed using OBD 203 data such as speedometer, odometer, tachometer data or speed inferred from GPS data. Speeding violations may be determined by comparing vehicle speed (as provided by the OBD 203 or as inferred from GPS data) to a speed-by-street database such as a generic third-party data set similar to that commercially available from NAVTEQ of Chicago, Ill., and generating a driver violation when the vehicle speed exceeds the speed-by-street. The driver violation causes the MCM 202 to generate an audible/visual warning to the driver in order to change driver behavior over time. In this manner, the vehicle monitoring system provides for mentoring of driver behavior in order to improve safety and reduce fleet management costs.

Furthermore, the MCM 202 may be configured to determine vehicle speed such as during a turn where the vehicle is moving slower than the speed limit but the lateral acceleration levels as measured by the XLM 201 exceed the threshold values. Such a situation may occur when the driver is turning aggressively in a parking lot (i.e., hard turning). By integrating lateral acceleration over time, it is possible to determine instantaneous velocity of the vehicle at any point in the turn. Importantly, in one aspect of the invention, the generation of the warning signal to the driver starts a count-down timer wherein the vehicle monitoring system transmits an exception signal to the base station when the timer duration expires.

Alternatively, an exception signal may be generated when certain measured parameters exceed a threshold value by a large margin such as when the magnitude of the speeding violation exceeds a threshold of 100 mph. An exception signal may then be transmitted to the base station 104 such that appropriate fleet management personnel may be alerted. Such notification may be by any predetermined means and may include cell phone voice or text communication, paging, etc.

In addition to the warning signal at the vehicle, the driver may likewise be contacted by cell phone, page or other radio communications regarding the exception event.

The MCM 202 may be in receipt of numerous other sensors that may provide indication of driver violations. For example, the vehicle monitoring system may include a seat sensor 216 in communication with the MCM 202 and which is operative to generate a signal when the vehicle is moving and seatbelts of vehicle occupants are unfastened. In this regard, the vehicle monitoring system may include any number of mechanical and electronic sensors 217 in data communication with the MCM and which are configured to monitor at least one of the following vehicle parameters: low battery, engine temperature, ignition on/off, headlight turn indicator usage, ABS operability, trailer electrical/mechanical malfunction, proximity forward (tailgating) and proximity rearward (objects behind) and proximity sideways (swerving and lane departures) 218. Furthermore, mechanical and electronic sensors 219 may be provided to monitor at least one of the following driver parameters: blink rate (a sleep sensor), heart rate, blood pressure and any other physiological parameters.

The vehicle monitoring system may be operative to track and generate on-demand reports of hours-of-service (HOS) (e.g., on-duty/off-duty driving times, consecutive driving days) in compliance with Federal Motor Carrier Safety Administration regulations. The vehicle monitoring system may additionally be operative to facilitate apportionment of mileage tax by tracking vehicle mileage within a given geographic region by noting state and national border crossings. In another aspect of the invention, it is contemplated that correction for mileage errors can be compensated for by re-synchronizing the MCM 202.

More specifically, because of the drift in OBD 203 mileage data due to odometer error as a result of tire wear or variations in tire pressure and/or due to inconsistencies in the GPS receiver data as a result of multi-path errors due to interference with trees and buildings or signal delay errors caused by atmospheric interference, the present invention may include a process for re-synchronizing the MCM 202 during vehicle refueling. In this manner, fuel tax may be accurately tracked in order to reduce fleet fuel costs.

The MCM 202 may automatically send certain types of signals to the base station 104. For example, the vehicle monitoring system may further include a manually/automatically-activatable timer that is configured to generate a man down signal 220 that is sent to the base station when the timer duration is exceeded. For example, in remote job site locations such as at an oil well location where it is necessary for the driver to perform certain hazardous tasks outside of the vehicle, the driver may first activate a one-hour (or other duration) timer such that failure to deactivate the timer results in a man down signal being transmitted to the base station 104 so that help may be sent to the vehicle location. A similar message may be sent to the base station 104 via a panic button 221 activated by a driver, occupant or any nearby person and may operate similar to that of a fire alarm or emergency 9-1-1 phone call wherein fleet management may send help to the vehicle location.

As was earlier mentioned, the MCM 202 may be configured to send to the base station 104 an exception signal representative of a violation of one of a plurality of parameters comprising at least one of exceeding a predetermined speed along a given route, failure to wear seatbelt, failure to activate headlights, tailgating, excessive idle time, excessive engine RPM, engine parameters, tire condition, vehicle load condition, vehicle location violation. The parameter settings (i.e., logic) of the MCM 202 may be remotely changed by commands transmitted from the base station 104 to the MCM 202. More specifically, the rule sets that comprise the hierarchy (i.e., criticality) by which signals are transmitted from the MCM 202 to the base station 104 may be revised. For example, a hierarchy of signal transmission may be revised from: panic, man down, crash event, exception, non-urgent communication to a hierarchy of crash event, man down, panic, exception, non-urgent communication.

In this same regard, the MCM 202 in one aspect of the invention is configured to allow for wireless or remote manipulation from the base station 104 of vehicle settings through the OBD or CAN 203 and may allow for revising certain vehicle settings such as engine governor setting and ignition timing. In a further aspect, the vehicle monitoring system allows for generating reports or alerts (e.g., text and/or map) of recently-occurring accident locations and dangerous road conditions such that a warning signal may be provided to the driver when the vehicle approaches the accident location or road condition. Additionally, the system can be configured to geo-fence certain areas of interest and to notify specified and/or targeted individuals when the vehicle and its driver approaches or departs a geo-fenced area. As was earlier mentioned, the database 106 is configured to collect driver performance data over time, generate a driver performance database comprising vehicle type and driver profile, and generate reports of predictive driver behavior based on historical driver performance data with the option of generating a graphical representation such as a bar chart of driver performance.

Additional modifications and improvements of the present invention may also be apparent to those of ordinary skill in the art. Thus, the particular combination of parts described and illustrated herein is intended to represent only one embodiment of the present invention and is not intended to serve as limitations of alternative devices within the spirit and scope of the present invention.

Global Asset Information Network (GAIN) 110 (FIG. 1) is a portal for fleet asset management and for monitoring driver safety. GAIN is a robust data collection and reporting system. Using an internet browser 111, fleet managers have a view into their fleet's current status. They can see all pertinent aspects of fleet operations from complex indexing and trending of aggressive driver behavior to simple location of the entire fleet. Fleet managers and safety managers can use the GAIN portal to access the information reported by the vehicle monitoring equipment. Vehicles collect the data and report in at specific times, such as a preselected interval, at random intervals, when requested, by exception, or in an emergency. Vehicles report to GAIN via satellite 109, cellular network 108, or other communications device to database 106. GAIN turns the data into actionable information providing visual reports at various levels of aggregation. The GAIN system 110 can be set to notify managers when emergencies such as panic, man down, accidents, unauthorized vehicle movement (theft) or other company selected events occur.

FIG. 3 is an illustration of exemplary inputs that may be provided to the MCM 202 from the vehicle and which may result in outputs from the MCM 202. OBD II/CAN 203 collects data from the vehicle's on-board diagnostic system, including engine performance data and system status information. GPS receiver 207 provides location information. CDR 205 provides data in the event that a crash threshold is exceeded. Accelerometers 201 provide information regarding the vehicle's movement and driving conditions. The user may provide information to MCM 202 via the mobile data terminal 208. Any number of other sensors 301, such as seat belt sensor 216, proximity sensor 218, driver monitoring sensors 219, or cellular phone use sensors, also provide inputs to MCM 202.

MCM 202 can determine when an exception condition occurs or when a threshold is exceeded that requires an alarm 302 to be generated in the vehicle. The alarm 302 may be an audible or visual warning for the vehicle occupants. Additionally, any of the data collected may be passed on to database 106 at server 105 where it may be further processed or accessed by fleet managers via GAIN system 110.

FIG. 4 is an illustration of exemplary inputs that may be provided to the MCM 202 from the base station 104 or server 105 and which may include commands to reconfigure the rule set/logic of the MCM 202. MCM 202 may receive mapping and routing information 401, such as mapping updates, accident information, and road information. MCM 202 may also receive instructions 402 which include updated, revised, or corrected rule sets, commands or logic to control the operation of MCM 202. Audible and visual messages 403 may also be sent via MCM 202 and then played or displayed to the driver. MCM 202 may use updated rule set 402, for example, to modify or configure the operation of vehicle systems via OBD 203. Control information may also be provided to the XLM or accelerometers 201, CDR 205, or the mobile data terminal 208.

Figure 5:
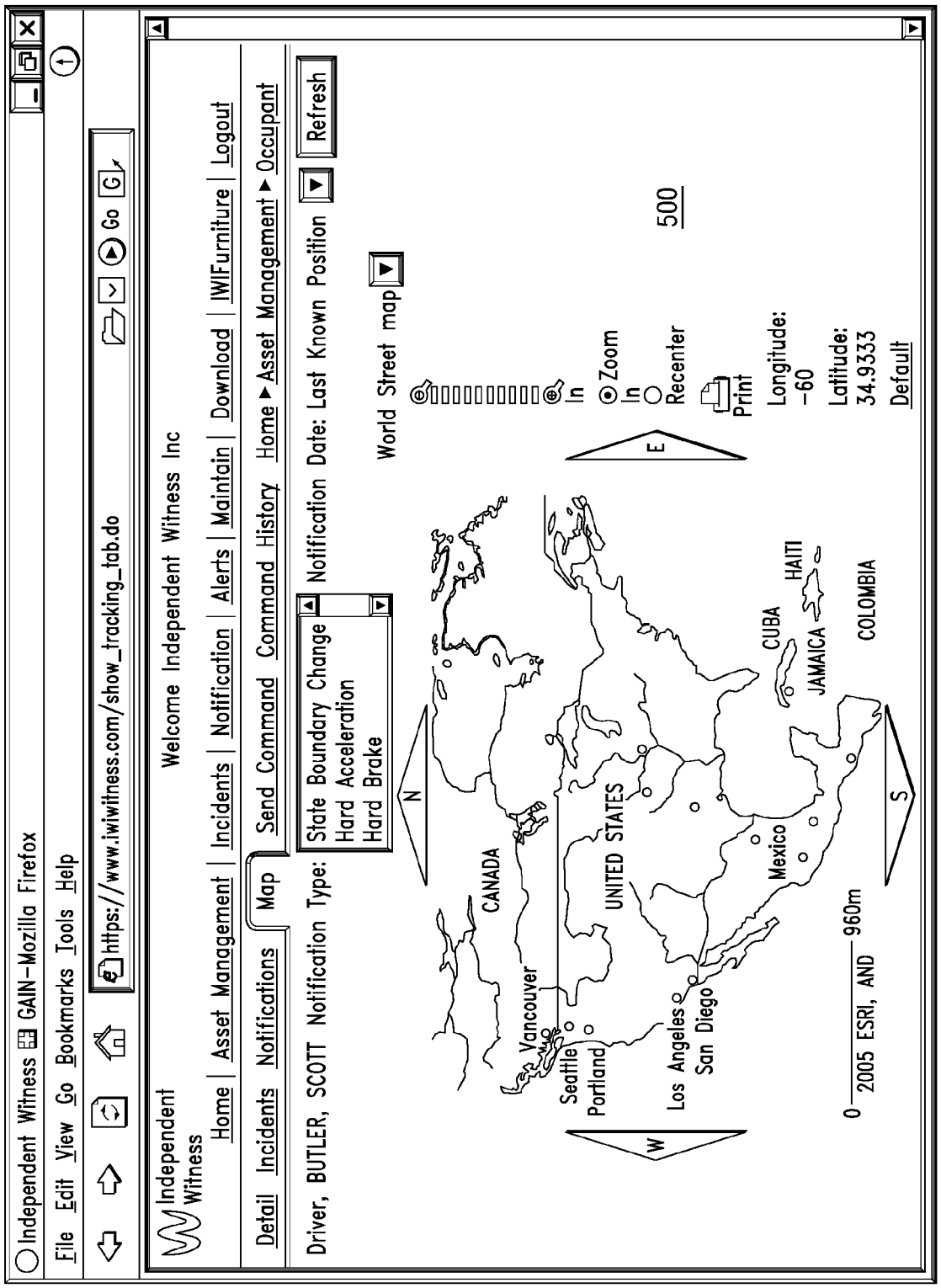
FIG. 5 is a sample graphic display of the DCS such as may be accessible from an internet portal after a user logs in and illustrating the provided capability of simultaneous viewing of driver and vehicle data such as geographic position of the vehicle as well as the ability to select from among multiple parameters for tracking vehicles and driver performance in addition to providing other options including issuing of commands to the MCM.

FIG. 5 is an example of the display 500 that may be accessible from internet portal 111 after a user logs in to GAIN system 110, for example. Display 500 provides the capability to simultaneously view driver and vehicle data, such as geographic position of the vehicle. The user also has the ability to select from among multiple parameters for tracking vehicles and driver performance in addition to providing other options including issuing of commands to the MCM 202.

In embodiments of the invention, a comprehensive driver monitoring and mentoring system installed in a vehicle has one or more of the following components. An on-board diagnostic (OBD) system operative to monitor vehicle parameters and to generate an OBD input signal representative thereof. The vehicle monitoring system may be enclosed in a sealable housing that is permanently or temporarily mountable on the vehicle. A crash data recorder (CDR) is included with the vehicle monitoring system and is configured to measure and record vehicle acceleration, including the magnitude, direction and profile of such accelerations, during a crash event and to generate CDR signals. An accelerometer module (XLM) contains at least one accelerometer, such as a tri-axial accelerometer, and is mounted within the housing. The XLM is operative to monitor driver performance by measuring acceleration in at least one of a lateral, longitudinal and/or vertical direction over a predetermined time period. The XLM generates an XL signal when acceleration exceeds a predetermined threshold. In one embodiment, the CDR and XLM may be combined so that one set of accelerometers serves both functions.

A GPS receiver mounted is preferably within the housing and is configured to track the location and directional movement of the vehicle and to generate a GPS signal. The vehicle's user may access the driver mentoring and monitoring system using a mobile data terminal (MDT), which preferably has a mechanism for communicating warnings to the user, such as a speaker or light. A master command module (MCM) mounted within the housing is operative to receive inputs from the CDR, XLM, OBD, GPS receiver, and MDT. The MCM is operative to transmit signals representative of one or more vehicle operating parameters. The MCM is further configured to generate audible and/or visual warning signals to the driver when at least one of the vehicle's movement characteristics exceed a predetermined threshold value.

A base station server is in communication with the driver mentoring and monitoring system and the MCM. The server has a data collection system (DCS) that is accessible through at least one server portal and being configured to receive data from the MCM at predetermined or random times and generate reports of driver performance. The server may also cause the MCM to transmit a warning signal to the vehicle when driver violations or exceptions are detected, such as speeding, hard turn, hard brake, hard vertical, cellular phone use, or a seatbelt violation. The MCM may send a notification to the server during other predetermined events, such as a panic alarm, man down, accident, uncorrected driver violations, or unauthorized vehicle movement.

The vehicle monitoring system is adapted to monitor driver performance and may be in continuous communication with a base station. The vehicle monitoring system comprises one or more of the following components. A self-contained CDR mountable on the vehicle and configured to measure vehicle crash impulses and generate CDR input signals representative thereof. An XL module mountable on the vehicle and operatable to measure vehicle acceleration in at least one of lateral, longitudinal and/or vertical directions and to generate XL input signals representative thereof. A mobile data terminal (MDT) mountable on the vehicle and operative to continuously transmit CDR and XL input signals from the vehicle to a base station. A driver warning device mounted on the vehicle.

In one embodiment, the base station is operative to receive the CDR input signals and to generate a crash signal when the crash impulses exceeds an impulse threshold value stored at the base station. The base station is operative to emit an alert signal at the base station to alert personnel of the accident. The base station is also operative to receive the XL input signals and generate an exception signal when vehicle acceleration exceeds an acceleration threshold value stored at the base station and transmit a command to the MDT to activate the driver warning device. The base station may have a data collection system (DCS) configured to receive data from the MCM and to record driver performance and to generate warnings for at least one of the following violations: hours of service (HOS), speeding, hard turn, hard braking, hard acceleration, hard vertical movement, failure to use seatbelt, failure to use headlights, and failure to use turn signal.

In addition to or in place of the logic contained in the base station, logic may also be included in the MCM to monitor the vehicle and driver performance and to generate warnings. The vehicle monitoring system may be in at least intermittent, if not continuous, communication with a base station. The vehicle monitoring system may comprise one or more of the following components. A self-contained CDR mountable on the vehicle and being configured to measure vehicle crash impulses and generate a crash signal when the crash impulses exceeds an impulse threshold value stored at the CDR. Software or firmware providing a methodology for collecting data at regular or non-regular intervals. An XL module mountable on the vehicle and operative to measure vehicle acceleration in at least one of lateral, longitudinal and/or vertical directions and to generate an exception signal when vehicle acceleration exceeds an acceleration threshold value stored at the XL module. A mobile data terminal (MDT) operative to intermittently transmit the crash and exception signals from the vehicle to the base station. A driver warning device may be mounted on the vehicle. The base station is operative to receive the crash and/or exception signals and to alert personnel.

The vehicle monitoring system may correlate accident data from the CDR and XL Modules to potential injuries. The present invention provides a system and method of correlating personal injury and property damage with driver behavior measured prior to a vehicle crash and impulse forces measured during the vehicle crash. The CDR may measure crash impulses and the XL module may monitor driver behavior in terms of hard turns, hard braking and hard vertical movement of the vehicle. In one embodiment of the present invention, a crash database comprising personal injury and property damage characteristics is generated. For example, characteristics of the injured person's age, gender, height, weight, occupation, hobbies, income, prior claims, physical condition, injury type and severity may be collected. Vehicle model, condition, damage type and location, as well as impact characteristics, such as acceleration magnitude and direction during the crash, change in velocity between the time of impact and at least one millisecond following impact.

The vehicle monitoring system records crash impulse forces acting upon the vehicle during the crash. Driver behavior prior to the accident is also recorded by measuring acceleration in at least one of lateral, longitudinal and/or vertical directions in order to identify hard turns, hard braking and hard vertical forces experienced by the vehicle up to the time of the accident. The vehicle crash impulse data is correlated to an injury characteristic, such as by correlating accident forces to bodily injury claims, in order to determine the probability of the vehicle crash as a causal factor of the bodily injury. The database may further include at least one of the following data sets: probability of settlement in an insurance claim filed in relation to the vehicle crash, average cost of settlement, and settlement structure.

The present invention may also be used for mentoring driver behavior using data collected from the XL module. In one embodiment, driver behavior may be monitored and/or modified in a vehicle having an OBD and/or GPS receiver and an accelerometer module, which may be an XL module containing at least one accelerometer. Preferably, the accelerometer module will be a tri-axial accelerometer. The system measures vehicle acceleration in at least one of lateral, longitudinal and/or vertical direction and may determine vehicle speed from a vehicle speedometer (via an OBD) or by inferring speed from GPS readings. The measured acceleration is compared to a predetermined threshold, and the speed is compared to a speed-by-street dataset. A warning signal is sent to the driver when the measured acceleration exceeds the threshold and/or when the speed exceeds those contained in the speed-by-street dataset. A timer may be started when the warning signal is sent to allow the driver a predetermined amount of time to reduce the acceleration or speed. A notification signal may be sent to a base station if the driver fails to reduce acceleration or speed during the predetermined amount of time. The timer may be configurable for any amount of time, including zero or no delay.

In order to provide more accurate measurements of driver behavior, in one embodiment, the present invention filters gravity out of accelerometer readings as the vehicle changes its horizontal surface orientation. Driver performance can be monitored and mentored in a vehicle having an accelerometer module, which may be an XL module containing at least one accelerometer. Preferably, the accelerometer module will be a tri-axial accelerometer. Acceleration is measured in at least one of lateral, longitudinal and/or vertical directions over a predetermined time period, which may be a period of seconds or minutes. An XL acceleration input signal is generated when a measured acceleration exceeds a predetermined threshold. Gravitational effects are filtered out of the longitudinal, lateral and vertical acceleration measurements when the vehicle is on an incline.

The present invention may also record road hazards at server database. This allows for optimization of vehicle routing in a fleet of vehicles each having a GPS receiver and a driver-activated hazard notation mechanism. The notation mechanism is activated by the driver of each vehicle when the vehicle encounters adverse road conditions, road hazards, or unsafe speed limits, for example. The notation mechanism generates a time-stamped notation signal including GPS positional data of the hazard along the road. The notation signal is transmitted to a base station for recording in a database. The location of the road hazard is then transmitted to other vehicles in the fleet.

The logic and rule sets used by the vehicle monitoring system described herein may be modified or reconfigure in real-time at the vehicle. The present invention provides for real-time revising of the reporting of vehicle behavior in a fleet management system. A base station is in communication with a fleet of vehicles each having an MCM or processor for receiving inputs from vehicle-mounted systems, including, for example, OBD, GPS receiver, CDR, MDT, and an XL module. The MCM contains an original rule set or logic for processing inputs from the vehicle-mounted systems. Commands may be transmitted from the base station to the MCM. The commands may include a revised rule set regarding processing of the inputs, such as the rules for comparing inputs to thresholds, reporting, and the like, at the MCM. The logic in the MCM is revised in response to the revised rule set command received from the base station. Inputs at the MCM are then processed according to the revised rule set. For example, the revised rule set may include a reduced lateral acceleration threshold as measured by the XL module and by which the measured lateral acceleration is compared to determine the occurrence of a driver violation. The revised rule set may also change reporting of the driver violation to the base station.

The present invention may also provide fleet location displays to a user. The location of a fleet of vehicles may be visualized in real-time on a web-based portal. The portal is linked to a server that is in communication with the vehicles. The vehicles each have an MCM for receiving inputs from vehicle-mounted systems, including an OBD, GPS receiver, CDR, MDT, and XL module. A number of display options may be selected for displaying the location of the vehicles on a geographic area or map. The options include, for example, displaying an entire fleet of vehicles, an individual vehicle in the fleet, a group of vehicles in the fleet wherein the vehicles are grouped by a predetermined set of criteria, such as by type of vehicle or load, vehicles in the fleet reporting exceptions to the base station with a previous time period of predetermined duration, or vehicles within a specific geographic zone.

The present invention also provides for modification of reporting intervals by the vehicle monitoring system. The reporting of fleet vehicle behavior characteristics to a base station or server may be configured in different ways. The following options are examples of vehicle behavior reporting characteristics: at predetermined time intervals, at random time intervals, upon request from the base station, upon occurrence of an exception, upon the occurrence of an emergency or specific event, such as panic alarm, man down, or theft. The reporting may be provided at the vehicle and/or at the base station by means of one of the following: e-mail, cell phone voice and/or text message, or pager message. The reporting includes the following driver violations, if they have occurred, hours of service, speeding, hard turn, hard braking, hard vertical, or failure to use seatbelt.

Figure 6:
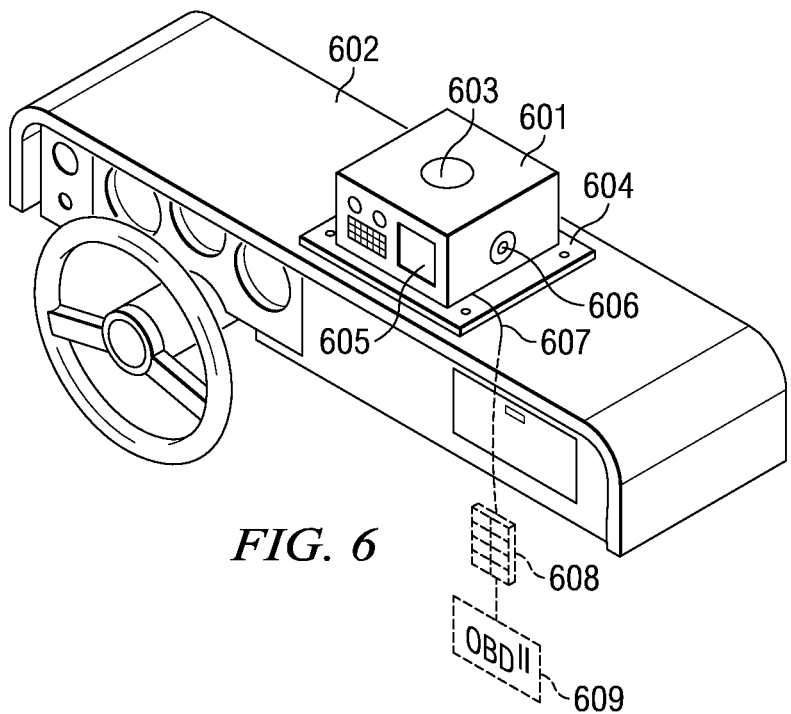
FIG. 6 illustrates a vehicle monitoring system installed in a vehicle according to one embodiment of the invention.

In one embodiment, the vehicle monitoring system of the present invention is an easily installed, all-in-one unit. Referring to FIG. 6, vehicle monitoring system 601 is installed on dashboard 602 of a vehicle. Vehicle monitoring system 601 provides all or some of the above-described vehicle and driver monitoring features in a small package. Vehicle monitoring system 601 is preferably positioned on dashboard 602 so that antenna 603 has an unobstructed exposure to the sky through a window, such as the windshield, of the vehicle. It will be understood that the windshield may be the front or rear window of the vehicle, and that the system 601 may be mounted at positions other than the dashboard in other embodiments. Antenna 603 may be a GPS antenna and/or a communication antenna. Alternatively, multiple antennas may be placed on the monitoring system 601. By placing monitoring system 601 on the dashboard, antenna 603 will be in an optimize position within the vehicle to allow system 601 to communicate with or transmit/receive signals to/from satellites, wireless network or cellular system towers, WiFi network, or other communication systems.

Vehicle monitoring system 601 may be securely mounted on dashboard 602, such as by a mounting bracket or Velcro 604. Alternatively, monitoring system may be positioned on dashboard 602 without using any attachment device as long as it does not move during operation of the vehicle. Accordingly, system 601 can be moved to different locations within the vehicle, if desired, or may be easily moved between different vehicles. However, during operation of the vehicle, it is important that vehicle monitoring system 601 be secured to the vehicle so that system 601 can properly measure and evaluate the vehicle's operating parameters, such as accelerations and location.

Vehicle monitoring system 601 may have any type of user interface 605, such as a screen capable of displaying messages to the vehicle's driver or passengers, and a keyboard, buttons or switches that allow for user input. User interface 605 may have one or more status LEDs or other indicators to provide information regarding the status of the device's operation, power, communications, GPS lock, and the like. Additionally, the LEDs or other indicators may provide feedback to the driver when a driving violation occurs. The monitoring system may also provide for emergency communications, such as a one-touch help (emergency/911) button on the user interface 605. Additionally, monitoring system 601 may have a speaker and microphone 606 integral to the device.

Monitoring system 601 may be self-powered, such as by a battery, or powered by the vehicle's battery. Access to the vehicle's batter power may be by accessing the power available on the vehicle's OBD and/or CAN bus. Power line 607 may connect to OBD connector 608, which is linked to OBD 609. Alternatively, power line 607 may be spliced or connected directly into the OBD bus during the installation of vehicle monitoring system 601. The noise and quality of the power available from the OBD or CAN bus is typically much better than the power that is directly available from the battery or other places in the vehicle's electrical system. By connecting to OBD 609, monitoring system 601 is able to obtain a minimum level of "clean" and reliable power for operation. On the other hand, vehicle monitoring system 602 is designed to limit the power drain on the OBD bus to prevent damage or adverse impact to the vehicle's OBD system.

Vehicle mounting system 601 may be easily mounted on the windshield 602 in any typical vehicle and easily connected to the OBD/CAN power supply. This would allow for monitoring of almost any vehicle, such as a fleet vehicle or private car, and for monitoring and mentoring of any driver, such as a fleet driver, teen driver, or driver using a particular insurance company, with little or no impact on the vehicle or the driver.

Vehicle monitoring system 601 is preferably self-orienting, which allows it to be mounted in any position, angle or orientation in the vehicle or on dashboard 602. The self-orienting capability gives drivers, installers and fleet owners more flexibility in deciding how and where to mount vehicle monitoring system 601. When vehicle monitoring system 601 is first installed on dashboard 602 or in some other location in the vehicle, it may be oriented at any angle or rotation. For example, dashboard 602 may be sloped so that system 601 may be mounted with some degree of pitch relative to the earth's surface. Therefore, system 601 cannot assume that the bottom of the device is parallel to the ground or that gravity acts perpendicular to the device. Furthermore, system 601 may not be aligned with the direction of movement of the vehicle, but instead may be mounted in a position such that user interface 605 is rotated to face the driver. Accordingly, system 601 cannot default to a setting that assumes that the device 601 is aligned with or parallel to the centerline of the vehicle. An incorrect assumption as to the alignment and orientation of device 601 may result in erroneous measurements of the vehicle's acceleration, orientation, location and movement.

Figure 7:
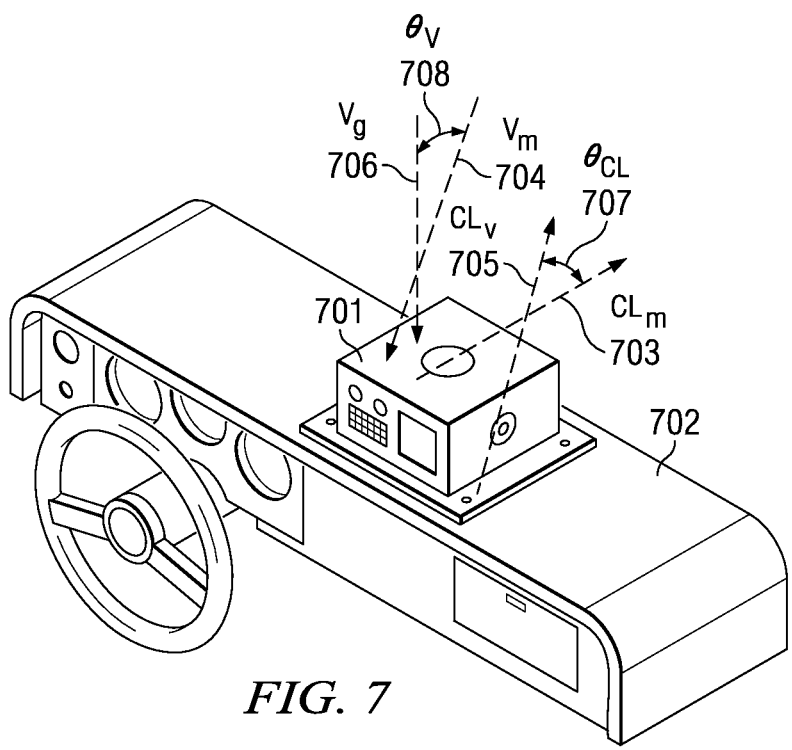
FIG. 7 illustrates is a vehicle monitoring system installed in a vehicle according to another embodiment of the invention.

In embodiments of the present invention, vehicle monitoring system is self-orienting, which allows it to determine a direction of gravity and a direction of vehicle movement. Using these two directional vectors, the monitoring system can determine the actual orientation of the device with respect to the vehicle. FIG. 7 illustrates vehicle monitoring unit 701 installed on dashboard 702 of a vehicle according to another embodiment of the invention. Three-axis accelerometers are fixedly mounted within unit 701. The monitoring system knows the orientation of the accelerometers with respect to the centerline of the monitoring unit $CL_m$ 703 and with respect to the vertical axis of the unit $V_m$ 704. If monitoring unit 701 is installed such that it is not flat and not oriented parallel with the centerline of the vehicle, then the accelerometers in unit 701 may misinterpret any detected movement. For example, if the centerline $CL_m$ 703 of unit 701 does not align with the centerline $CL_V$ 705 of the vehicle, then the accelerometers in monitoring unit 701 may incorrectly interpret an acceleration as a turn or a turn as an acceleration because of the offset $\Theta_{CL}$ 707 between the accelerometer orientation and the vehicle's orientation.

To compensate for the mounting position of monitoring unit 701, a self-orienting application is started after installation. The self-orientation determines the mounting position of unit 701 and calculates how to compensate for that unit's particular installation orientation. The accelerometers in unit 701 determine gravity vector $V_g$ 706 by observing the forces on the accelerometers when the vehicle is stopped. The only force on the vehicle should be a 1 G pull from gravity. The monitoring system can measure and store the gravity vector $V_g$ 706 as reference for the vertical positioning of unit 701. The monitoring system can then calculate an offset angle $\Theta_m$ 708 representing the angular difference between vertical axis $V_m$ 704 and gravity vector $V_g$ 706.

After the vehicle begins to move, monitoring system 701 can determine the orientation of the centerline $CL_V$ 705 of the vehicle by observing forces that occur while the vehicle is moving. When a vehicle begins to move or is breaking, the vehicle is usually traveling in a straight line along $CL_V$ 705. The braking forces may be more noticeable to unit 701 because drivers often brake harder than they accelerate. Accordingly, it is typical for breaking or vehicle deceleration to be a stronger force than a normal acceleration. By measuring the breaking, vehicle acceleration, or both types of force, the accelerometers in monitoring system 701 can determine the orientation of vehicle centerline $CL_V$ 705. The monitoring system can then calculate an offset angle $\Theta_{CL}$ 707 representing the angular difference between centerline of the monitor $CL_m$ 703 and the centerline of the vehicle $CL_V$ 705.

Measurement of gravity vector $V_g$ 706 could be accomplished almost instantaneously in a vehicle that is stopped. However, it may take varying amounts of time to determine vehicle $CL_V$ 705 because that is based upon how the vehicle is moving. If the vehicle brakes hard a number of times in a straight line after the self-aligning application begins, then vehicle $CL_V$ 705 can be determined quickly. It may take longer to identify vehicle $CL_V$ 705, if the vehicle does not experience accelerations or decelerations of sufficient magnitude. Once the offset angles $\Theta_{CL}$ 707 and $\Theta m$ 708 can then be used as a reference framework to convert observed acceleration measurements at monitoring unit 701 to the actual accelerations experienced by the vehicle. In most embodiments, the self-orienting application will only need to be run one time after installation; however, the self-orienting application may run continuously or periodically to update the orientation of unit 701, if necessary.

Figure 8:
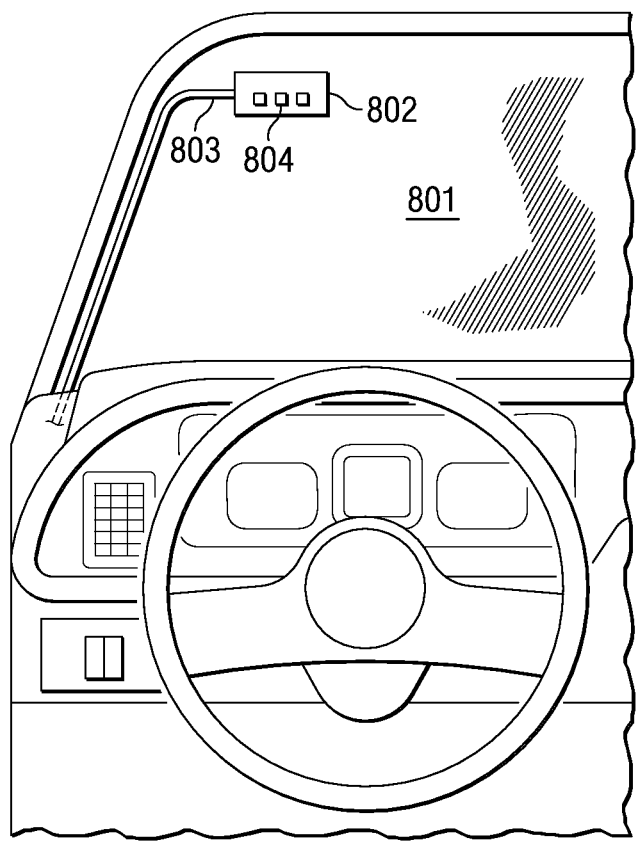
FIG. 8 illustrates an alternative vehicle monitoring system installed in a vehicle according to embodiments of the invention.

FIG. 8 illustrates an alternative embodiment of vehicle monitor 802 which is mounted directly to windshield 801. Monitor 802 may be affixed to windshield in any appropriate manner such as by glue or by Velcro glued to windshield 801 and to monitor 802. Monitor 802 may be permanently or removably mounted on windshield 801. Vehicle monitor 802 may be powered by an internal battery or by the vehicle's battery. In a preferred embodiment, monitor 802 is powered by an on-board diagnostic system, such via an OBD II or CAN bus, or any electronic control unit or electronic control monitor system in the vehicle. Cable 803 is a power and/or cable used in one embodiment of the invention. Cable 803 may be coupled to the on-board diagnostic system bus to provide power to monitor 802. Additionally, cable 803 may provide data from the on-board diagnostic system, such as vehicle speed, engine parameters, to monitor 802.

Monitor 802 may includes any of the vehicle monitoring systems described herein or other features. Monitor 802 may be a self-orienting device that uses gravity and movement of the vehicle to determine its orientation relative to the vehicle as described herein. Monitor 802 may also include GPS capability to determine the vehicle's location and may use changes in the vehicle's location over time to determine vehicle speed. Monitor 802 may also incorporate accelerometers to identify aggressive driving and/or collisions. Warning indicators and input buttons 804 may include a one-touch help or emergency/911 button and may include at least one status LED for operations, power, communications, GPS lock, and driving violation. Monitor 802 may also include a speaker and a microphone internally for communication between the driver and a remote location and/or for providing audible warnings to the driver. Monitor 802 may also include a screen for displaying text or iconic messages and warnings to the driver.

It will be understood that the present invention may be used for both fleets of vehicles and for individual drivers. For example, the vehicle monitoring system described herein may be used by insurance providers to monitor the driving behavior of customers and to use collected data to set insurance rates. A private vehicle owner may also use the present invention to monitor the use of the vehicle. For example, a parent may use the system described herein to monitor a new driver or a teenaged driver.

The present system provides for improved safety and asset monitoring and management. In one embodiment, the vehicle monitoring system may include as few features as a wireless communication module and a GPS module. The communication module may be a cellular phone, satellite communication system, WiFi communication device, or any other wireless communication system. The GPS module would provide location information for the vehicle. This system could be installed in a vehicle, such as on a windshield or dashboard, and would transmit vehicle information to a central location regarding vehicle use. The system could accept inputs from an on-board diagnostic system, such as vehicle speed, engine parameters, or the like. The system could also be powered by the on-board diagnostic system or by the vehicle's battery or using its own power source. A housing may comprise both the wireless communication module and the GPS module. The housing may also comprise antennas for the communication and GSP modules. When mounted on a windshield, the antennas would be optimally positioned so that they are exposed to open sky and not obstructed by the vehicle. The housing could also be mounted on the vehicle dashboard.

One embodiment of the present invention is directed to a system and method for evaluating or grading driver performance. For example, a new driver, a teen driver, or an experienced driver's driving performance may be monitored using a vehicle monitoring system such as those disclosed herein or any other type of monitor. The driver's performance is monitored and graded against established criteria, such as occurrence and severity of speeding, occurrence and severity of excessive acceleration or braking, seatbelt use, mobile phone or wireless device use, turn signal use, or any other vehicle operation parameters. The driver's performance may be graded on an easy to understand scale, such as an A, B, C, D, F scale, or a numerical or other scale. The driver's performance grade may be provided to a third party such as, for example, a parent who wants information on their teen driver or an insurance company that can use the grades to set insurance rates or prices. The driver may be evaluated at regular intervals, which would allow them to improve their performance and grade.

Figure 9:
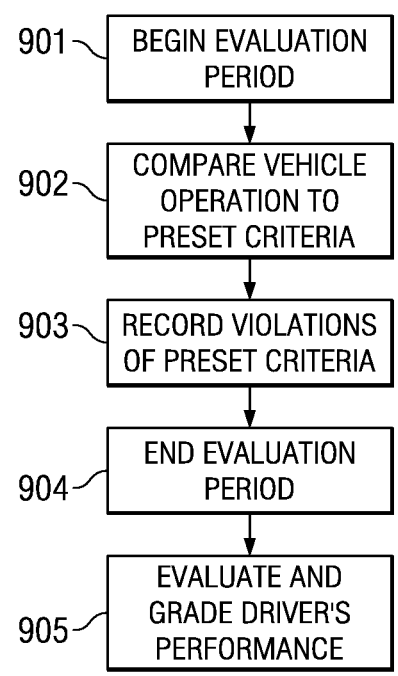
FIG. 9 illustrates a process for grading driver performance according to one embodiment of the invention.

FIG. 9 is a flowchart illustrating one process for evaluating driver performance according to an embodiment of the invention. The evaluation period begins at 901. During the evaluation period, the vehicle's operation is compared to preset criteria (902). A record is made each time a preset criteria is violated (903). The evaluation period ends at 904, and the driver's performance is evaluated at 905. It will be understood that the evaluation period may be of any length. In one embodiment, the evaluation period corresponds to a set period of time, such as a period of days, weeks or months. In other embodiments, the evaluation period corresponds to a number of uses of the vehicle, such as a single use (i.e. each use or each drive is graded separately) or a group of uses in which a grade is issued for every 10, 25, or 100 drives or vehicle uses, for example. Every time the vehicle is turned on or the engine started may correspond to a new drive or a new use.

As noted above, any vehicle parameter may be selected for evaluation of the driver's operation of the vehicle. Speeding incidents may be selected as a grading criteria. Each time the driver speeds, it may be recorded for that evaluation period. The determination of what is "speeding" may vary depending upon the preset criteria. One or more speeding thresholds may be set for the vehicle, and a speeding violation will be recorded any time the vehicle exceeds these thresholds. For example, a seventy (70) mile-per-hour (MPH) threshold may be set for all streets and, if the vehicle exceeds this threshold, then a speeding incident is recorded. A higher threshold may also be set, such as a ninety (90) MPH threshold, that results in an additional violation record if that higher threshold is exceeded. These preset MPH speeding thresholds may apply to every street or to streets in a certain area. Alternatively, speeding criteria may be applied on a street-by-street basis in which the specific speed limit on each street is taken into account. For example, speeding violations may be detected as disclosed in U.S. patent application Ser. No. 11/805,238, filed May 22, 2007, now U.S. Pat. No. 7,859,392 issued Dec. 28, 2010 entitled System and Method for Monitoring and Updating Speed-By-Street Data, the disclosure of which is hereby incorporated by reference herein, which allows the vehicle monitoring system to identify speeding incidents based upon the specific speed limit that is set of a street instead of using a generic speeding threshold.

Vehicle acceleration or braking may also be used to evaluate driver performance. For example, thresholds may be set to identify when the vehicle's acceleration from a stop exceeds a particular limit to detect "jackrabbit starts" or other displays of speed or performance. Lateral acceleration thresholds may also be set to detect when the vehicle takes a turn at a speed that is too fast for the curvature of the road. Additionally, hard braking may be detected using the vehicle monitoring system. Repeated incidents of hard braking may indicate that the driver is following other vehicles too closely or not paying attention to traffic conditions. The accelerometers on the vehicle monitoring system may detect and measure hard turns, hard acceleration, hard braking, and/or hard vertical movement. Any or all of these hard moves may be selected as driver performance criteria and may be used to grade or evaluate a driver.

Other information can also be used to grade the driver's performance. For example, the vehicle monitoring system may detect whether the driver and/or passengers are using seatbelts. Seatbelt use may be detected via the OBD or CAN bus if the monitoring system is coupled to one of those buses. If a driver does not use his seatbelt with the car in drive, typically a warning icon or caution light is illuminated on the dashboard to warn the driver. The vehicle monitoring system may capture that data from the OBD or CAN bus and use it to identify improper driving behavior.

Additionally, the vehicle monitoring system can be configured with a sensor to detect mobile phone or wireless device use while the vehicle is operating. Such a sensor detects wireless signals originating from within the vehicle. Criteria may be set up to evaluate if the driver is using a cell phone while driving. Turn signal use can also be detected. By comparing the vehicle's route to a map in the GPS system, for example, the vehicle monitoring system may identify when the driver fails to use a turn signal. Depending upon the accuracy of the street mapping data, the turn signal use can be evaluated for turns at an intersection, entering or exiting a highway, or changing lanes. Other vehicle operation parameters can be monitored and used to evaluate driver performance. For example, if a teen driver revs the engine during a stop, as indicated by engine RPM parameters, it may indicate aggressive driving behavior. Additionally, excessive horn use may indicate aggressive driving.

Other criteria that are not specific to operation of the vehicle may be used to evaluate the driver's overall performance. The driver may be restricted to a certain route or area. For example, a teen driver may be restricted to an area in the driver's neighborhood or to a route between home, school and/or work. If the driver goes outside these boundaries, then their driving grade may be lowered based upon an improper use of the vehicle, without regard to whether the vehicle was operated properly during that time. The time of day of use may also be set so that a driver is only allowed to use the vehicle at certain times. If the driver uses the vehicle outside that allowed time of day, such as late at night, then their grade may be lowered.

The duration of a drive or use may also be a grading criteria. For example, a teen driver's use might be limited to certain trips, such as driving to school or work. If the length of these trips would not reasonable exceed a certain time, then a trip duration threshold could be set so that the driver's grade is lowered if he uses the vehicle for too long of a time. If trips to and from school or work should not exceed 30 minutes, a limit of 45 minutes or an hour could be set in the grading system. If the driver uses the vehicle for more than the threshold time limit, then the driver's evaluation would suffer. Similarly, a trip length may be set so that any single vehicle use beyond a preset length would result in a lower grade.

In one embodiment, the driver may begin with a perfect grade or score, such as a "100" or an "A," and for each violation of the preset criteria or for some number of violations, the driver's score or grade is reduced. Each type of violation may be weighted so that different violations have different effects on the grade. For example, a single speeding or acceleration violation in a day may be weighted to have little affect on a grade. On the other hand, two or more violations within a short period of time, such as speeding multiple times during one drive or within a number of minutes, may be weighted to have more effect on the driver's grade. The performance criteria may be set for an individual driver or vehicle or may be generic criteria that apply to a class of drivers or all drivers.

Table 1 illustrates exemplary vehicle performance criteria that may be used to evaluate a driver during a grading period. Each time a violation occurs, it is recorded. A weight factor may be applied against each of the criteria, so that the importance of each criteria can be adjusted. At the end of the evaluation period, the weighted violations are totaled and the driver's grade is determined.

TABLE 1

| Performance Criteria | Number of Violations | Weight Factor |
|---|---|---|
| Speed greater than 90 MPH | | |
| Speed greater than 10 MPH over speed limit | | |
| Speed greater than 10% over speed limit | | |
| Excessive Forward Acceleration | | |
| Excessive Lateral Acceleration | | |
| Hard Braking | | |
| Use of wireless device | | |
| Failure to use seatbelts | | |
| Failure to use turn signal | | |
| Excessive horn use | | |
| Excessive engine RPM at stop | | |
| Driving outside of boundaries | | |
| Driving outside of allowed time of day | | |
| Excessive trip duration | | |
| Excessive trip length | | |

In one embodiment, the driver is provided with a score that follows an A, B, C, D, F or other well-known letter grading format, including, for example, "+" and "−" variations of letter grades (e.g. A+, A, . . . , D, D−, F). Such a grading system is easily understood by drivers and others who review the driving grades. For example, parents and teen drivers can easily understand a driving evaluation that follows their school's grading format. The weighting of each of the performance criteria may be adjusted so that the driving grades would follow a Gaussian distribution when averaged over a group of drivers, such as high-school-aged drivers. Numerical grades may be used in the alternative or together with alphabetical grades, if, for example, a student's school used such a grading scale. Such numerical scores may be used to calculate a driver's grade, and the numerical score then converted to an alphabetical grade before being presented to the driver. In other embodiments, the grading format may use words, such as "excellent," "good," "fair," "poor," or "unsatisfactory."

The tracking and calculation of the driver's driving performance, violations, scores and grades may be performed by the vehicle monitoring system or by a central server. The vehicle monitoring system itself may evaluate each vehicle use and, at the end of the evaluation period, display the driver's grade or send an email, text message or other communication containing the driver's grade. Alternatively, the vehicle monitoring system may send individual violations or regular reports to a central server that combines the reports and evaluates the driver's performance. In this way, a driver and other parties, such as parents or an insurance company, may review and evaluate the driver's grades. A parent may, for example, use driving grades to determine whether a teen driver is allowed to continue using the family car. An insurance company, for example, may use a driver's grade to set insurance rates wherein good driving performance results in lower insurance rates.

If multiple drivers use the same vehicle, then the vehicle monitoring system must determine who is driving the vehicle during each use so that the performance grading is specific to one driver. This determination may be manually accomplished such as by having the driver may enter his or her identification into the vehicle monitoring system at the beginning of each use. Alternatively, the vehicle monitoring system may use some other method to determine who is driving, such as via a fingerprint reader or other biometric or electrical system.

In one embodiment, the driver's grade is calculated on a running basis and is displayed to the driver while the vehicle is in use. Alternatively, the driver may receive a grade for each use of the vehicle, but a final grade report might not be sent to third parties until the end of the evaluation period. The vehicle monitoring system may also alert the driver or third party when specific events occur or when a major violation (e.g. excessive speeding) occurs that has a significant impact on the driving grade.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-implemented method for evaluating driver performance, the method being performed by a computing system that includes an on-board vehicle monitoring system having sensors for monitoring operations of a vehicle in which the on-board vehicle monitoring system is installed, the computing system also including a storage device storing driving criteria and driver profile data and a processor that is configured to execute computer instructions stored in the storage device to implement the method, the method comprising:
   the computing system detecting operations of a vehicle by a specific driver using one or more sensors of an on-board vehicle monitoring system installed in the vehicle;
   the computing system identifying violations in the operations by at least (a) comparing the operations by the specific driver of the vehicle to stored criteria and (b) using the one or more sensors of the on-board vehicle monitoring system for determining whether the specific driver is utilizing a wireless device during operation of the vehicle; and
   the computing system storing a record for each of the violations and, at the end of an evaluation period, and calculating a grade for the specific driver based on the identified violations.

2. The method of claim 1, wherein the grade is an alphabetical letter grade.

3. The method of claim 1, wherein the grade is a numerical grade.

4. The method of claim 1, further comprising:
   forwarding the violations to a central server, wherein the central server performs the calculating a grade, the computing system including the central server that is remotely located from the vehicle.

5. The method of claim 1, further comprising:
   forwarding the grade to the driver.

6. The method of claim 1, further comprising:
   forwarding the grade to a parent of the driver.

7. The method of claim 1, further comprising:
   forwarding the grade to an insurance company.

8. The method of claim 7, further comprising:
   setting insurance rates for the driver based, at least in part, upon the grade.

9. The method of claim 1, further comprising:
   calculating an interim grade during the evaluation period.

10. The method of claim 9, further comprising:
    displaying the interim grade to the driver.

11. The method of claim 9, further comprising:
    sending the interim grade to a parent or insurance company.

12. The method of claim 1, wherein a format of the grade is selected based upon a grading system for a school attended by the specific driver.

13. The method of claim 1, further comprising communicating the grade to a third party.

14. The method of claim 1, further comprising:
    receiving user verification information from a user of the vehicle;
    comparing the received user verification information to driver account information;
    determining whether the received user verification information matches a driver account; and
    upon verifying a match between the received user verification information and a driver account, associating the user with the driver account, the user comprising the specific driver.

15. The method of claim 14, wherein the user verification information is received via a fingerprint reader.

16. The method of claim 14, wherein the user verification information is received via an electrical system.

17. The method of claim 14, wherein the user verification information is received via a biometric system.

18. The method of claim 1, further comprising:
self-aligning the on-board vehicle monitoring system with the vehicle, comprising determining the presence of any angular deviation of the on-board vehicle monitoring system from at least one primary axis of the vehicle; and compensating for any determined angular deviation during the identifying violations.

19. The method of claim 1, wherein at least one of the criteria comprises a speed of the vehicle, and the method further comprises:
maintaining a speed-by-street speed limit database;
determining a location of the vehicle;
said identifying violations including comparing the operating speed of the vehicle against the street-by-street speed limit database based on the determined location of the vehicle.

20. A computer-implemented method for grading the performance of a driver of a vehicle, the method being performed by a computing system that includes an on-board vehicle monitoring device having sensors for monitoring operations of the vehicle in which the on-board vehicle monitoring device is installed, the computing system also including a storage device storing driving criteria and driver profile data and a processor that is configured to execute computer instructions stored in the storage device to implement the method, the method, comprising:
the computing system identifying one or more parameters to be monitored, wherein the parameters are associated with the operation of the vehicle, and wherein the parameters are monitored by the monitoring device installed in the vehicle;
the computing system identifying a specific driver of a vehicle;
the computing system identifying one or more violation conditions by the specific driver for each parameter;
the computing system detecting violation condition occurrences by the specific driver;
the computing system calculating a grade for the specific driver based upon the violation condition occurrences, wherein the calculating a grade comprises weighting each of the violation condition occurrences for each parameter, wherein at least one of the each parameter has a different weight than at least one other of the each parameter;
the computing system self-aligning the monitoring device with the vehicle, comprising determining the presence of any angular deviation of the monitoring system from at least one primary axis of the vehicle; and
compensating for any determined angular deviation during the detecting violation condition occurrences.

21. The method of claim 20, wherein the detecting violation condition occurrences corresponds to violations that occur during an evaluation period.

22. The method of claim 20, further comprising:
sending the grade to the driver.

23. The method of claim 20, further comprising:
sending the grade to a parent or insurance company.

24. The method of claim 23, wherein the insurance company uses the grade to select one or more insurance rates.

25. The method of claim 20, wherein the grade is a letter grade.

26. The method of claim 20, wherein the grade is a numerical grade.

27. The method of claim 20, further comprising:
notifying the driver when selected violation conditions occur.

28. The method of claim 20, wherein one or more of the parameters are selected from the group consisting of:
seatbelt use;
turn signal use;
horn use;
wireless device use;
vehicle location;
time of vehicle use;
duration of vehicle use; and
length of trip.

29. The method of claim 20, further comprising communicating the grade to a third party.

30. The method of claim 20, wherein the one or more violation conditions includes speeding, further comprising:
maintaining a speed-by-street speed limit database;
determining a location of the vehicle; and
comparing the operating speed of the vehicle against the street-by-street speed limit database based on the determined location of the vehicle.

31. A system for evaluating driver performance, the system comprising:
a data interface; and
a processor, in communication with the data interface, the processor configured to receive vehicle data associated with vehicle operation, using the data interface,
wherein the processor is further configured to evaluate a specific driver performance using the received data associated with vehicle operation by the specific driver, and to output data based upon the evaluated driver performance,
wherein the processor is further configured to implement a method that includes:
the computing system detecting operations of a vehicle by the specific driver using one or more sensors of an on-board vehicle monitoring system installed in the vehicle;
the computing system identifying violations in the operations by at least (a) comparing the operations by the specific driver of the vehicle to stored criteria and (b) using the one or more sensors of the on-board vehicle monitoring system for determining whether the specific driver is utilizing a wireless device during operation of the vehicle; and
the computing system storing a record for each of the violations and, at the end of an evaluation period, and calculating a grade for the specific driver based on the identified violations.

32. The system of claim 31, wherein the data interface is operable to receive data associated with vehicle operation via wireless communications.

33. The system of claim 32, wherein the wireless communications includes cellular network communications.

34. The system of claim 32, wherein the wireless communications includes satellite communications.

35. The system of claim 32, wherein the wireless communications includes infrared communications.

36. The system of claim 32, wherein the wireless communications includes ultrasound communications.

37. The system of claim 32, wherein the wireless communications includes short wave communications.

38. The system of claim 32, wherein the wireless communications includes microwave communications.

39. The system of claim 32, wherein the wireless communications includes wireless fidelity (WiFi) communications.

40. The system of claim 31, wherein the data interface is operable to receive data associated with vehicle operation via hardwired communications.

41. The system of claim 40, wherein the hardwired communications includes Ethernet.

42. The system of claim 40, wherein the hardwired communications includes a universal serial bus (USB).

43. The system of claim 31, further comprising:
- a data interface operable to receive processor verification information from a user of a vehicle; and
- a processor, in communication with the data interface, the processor configured to compare the received user verification information to driver account information, and upon verifying a match between the received user verification information and a driver account, to associate the user with the driver account.

44. The system of claim 43, wherein the processor is further configured to receive user verification information via a fingerprint reader in communication with the processor through the data interface.

45. The system of claim 43, wherein the processor is further configured to receive user verification information via a biometric system in communication with the processor through the data interface.

46. The system of claim 43, wherein the processor is further configured to receive user verification information via an electrical system in communication with the processor through the data interface.

47. The method of claim 31, wherein data associated with the vehicle operation comprises a speed of the vehicle, and the system further comprises:
- a street-by-street speed limit database;
- location circuitry configured to determine a location of the vehicle;
- circuitry comparing the operating speed of the vehicle against the street-by-street speed limit database based on the determined location of the vehicle.

* * * * *

UNITED STATES PATENT AND TRADEMARK OFFICE
CERTIFICATE OF CORRECTION

Page 1 of 1

PATENT NO.         : 9,067,565 B2
APPLICATION NO.    : 11/755556
DATED              : June 30, 2015
INVENTOR(S)        : McClellan et al.

It is certified that error appears in the above-identified patent and that said Letters Patent is hereby corrected as shown below:

In the Specification

Column 15
Line 17, change "optimize" to --optimal--

Column 21
Line 34, change "driver may enter" to --driver enter--

Signed and Sealed this
Eighth Day of March, 2016

Michelle K. Lee
*Director of the United States Patent and Trademark Office*